(12) United States Patent
Huang et al.

(10) Patent No.: US 7,401,133 B2
(45) Date of Patent: Jul. 15, 2008

(54) SOFTWARE ADMINISTRATION IN AN APPLICATION SERVICE PROVIDER SCENARIO VIA CONFIGURATION DIRECTIVES

(75) Inventors: Ricky Y. Huang, Portland, OR (US); Daniel Joseph Melchione, Beaverton, OR (US); Oyland Wong, Portland, OR (US)

(73) Assignee: Secure Resolutions, Inc., Mesa, AZ (US)

( * ) Notice: Subject to any disclaimer, the term of this patent is extended or adjusted under 35 U.S.C. 154(b) by 963 days.

(21) Appl. No.: 10/421,669

(22) Filed: Apr. 22, 2003

(65) Prior Publication Data

US 2003/0234808 A1 Dec. 25, 2003

Related U.S. Application Data

(60) Provisional application No. 60/375,216, filed on Apr. 23, 2002.

(51) Int. Cl.
*G06F 15/177* (2006.01)
(52) U.S. Cl. ..................................................... 709/220
(58) Field of Classification Search ................ 709/220, 709/225; 717/177; 719/310
See application file for complete search history.

(56) References Cited

U.S. PATENT DOCUMENTS

| | | | |
|---|---|---|---|
| 5,008,814 A | | 4/1991 | Mathur |
| 5,495,610 A | * | 2/1996 | Shing et al. .................. 709/221 |
| 5,778,231 A | * | 7/1998 | van Hoff et al. ............. 717/143 |
| 5,781,535 A | | 7/1998 | Russ et al. |
| 5,809,145 A | | 9/1998 | Slik et al. |
| 6,029,147 A | | 2/2000 | Horadan et al. |
| 6,029,196 A | | 2/2000 | Lenz |
| 6,029,256 A | | 2/2000 | Kouznetsov |
| 6,055,363 A | | 4/2000 | Beals et al. |
| 6,083,281 A | | 7/2000 | Diec et al. |
| 6,151,643 A | | 11/2000 | Cheng et al. |
| 6,199,204 B1 | | 3/2001 | Donohue |
| 6,256,668 B1 | | 7/2001 | Slivka et al. |
| 6,266,811 B1 | | 7/2001 | Nabahi |

(Continued)

FOREIGN PATENT DOCUMENTS

EP 0 811 942 A2 10/1997

(Continued)

OTHER PUBLICATIONS

"What's a Timeout Error?," <http://www.postscript.org/FAQs/language/node23.html>, Nov. 11, 1999 verison found via the Way Back Machine.

(Continued)

*Primary Examiner*—Frantz B. Jean
(74) *Attorney, Agent, or Firm*—Klarquist Sparkman, LLP

(57) ABSTRACT

Software can be administered via an application service provider scenario. An administrator can specify configuration directives to be implemented at nodes in a network. The nodes can be organized into groups. The configuration directives can be organized into policies. The administration functions can be performed via an application service provider scenario. For example, a browser-based user interface can be used to configure nodes and indicate appropriate settings, software, or behavior for the nodes. Agent software at a node can query a data center to discover and implement the configuration directives. More than one organization can be serviced by an application service provider.

24 Claims, 28 Drawing Sheets

U.S. PATENT DOCUMENTS

| | | | |
|---|---|---|---|
| 6,269,456 B1 | 7/2001 | Hodges et al. | |
| 6,314,565 B1 | 11/2001 | Kenner et al. | |
| 6,336,139 B1 | 1/2002 | Feridun et al. | |
| 6,385,641 B1* | 5/2002 | Jiang et al. | 709/203 |
| 6,425,093 B1 | 7/2002 | Singh et al. | |
| 6,442,694 B1 | 8/2002 | Bergman et al. | |
| 6,453,430 B1 | 9/2002 | Singh et al. | |
| 6,460,023 B1 | 10/2002 | Bean et al. | |
| 6,484,315 B1* | 11/2002 | Ziese | 717/173 |
| 6,516,337 B1 | 2/2003 | Tripp et al. | |
| 6,516,416 B2 | 2/2003 | Gregg et al. | |
| 6,601,233 B1 | 7/2003 | Underwood | |
| 6,625,581 B1 | 9/2003 | Perkowski | |
| 6,671,818 B1 | 12/2003 | Mikurak | |
| 6,691,176 B1 | 2/2004 | Narin et al. | |
| 6,701,441 B1 | 3/2004 | Balasubramaniam et al. | |
| 6,704,933 B1 | 3/2004 | Tanaka et al. | |
| 6,718,364 B2 | 4/2004 | Connelly et al. | |
| 6,721,941 B1 | 4/2004 | Morshed et al. | |
| 6,728,960 B1 | 4/2004 | Loomans | |
| 6,742,141 B1 | 5/2004 | Miller | |
| 6,760,903 B1 | 7/2004 | Morshed et al. | |
| 6,782,527 B1 | 8/2004 | Kouznetsov et al. | |
| 6,799,197 B1 | 9/2004 | Shetty et al. | |
| 6,826,594 B1 | 11/2004 | Pettersen | |
| 6,826,698 B1 | 11/2004 | Minskin et al. | |
| 6,892,241 B2 | 5/2005 | Kouznetsov et al. | |
| 6,910,066 B1 | 6/2005 | Pohl | |
| 6,931,546 B1 | 8/2005 | Kouznetsov et al. | |
| 6,944,632 B2 | 9/2005 | Stern | |
| 6,947,986 B1 | 9/2005 | Huang et al. | |
| 6,950,991 B2 | 9/2005 | Bloomfield et al. | |
| 6,982,729 B1 | 1/2006 | Lange et al. | |
| 6,983,326 B1 | 1/2006 | Vigue et al. | |
| 6,990,655 B2 | 1/2006 | Abdelhadi et al. | |
| 7,028,295 B2 | 4/2006 | Li et al. | |
| 7,089,259 B1 | 8/2006 | Kouznetsov et al. | |
| 7,130,921 B2 | 10/2006 | Goodman et al. | |
| 7,146,531 B2 | 12/2006 | Sarra et al. | |
| 7,178,144 B2 | 2/2007 | Melchione et al. | |
| 2001/0007100 A1 | 7/2001 | Revashetti et al. | |
| 2002/0091819 A1 | 7/2002 | Melchione et al. | |
| 2002/0095522 A1 | 7/2002 | Hayko et al. | |
| 2002/0124072 A1 | 9/2002 | Tormasov et al. | |
| 2002/0133723 A1 | 9/2002 | Tait | |
| 2002/0199118 A1 | 12/2002 | Yardley et al. | |
| 2003/0027552 A1 | 2/2003 | Kouznetsov | |
| 2003/0028653 A1 | 2/2003 | New et al. | |
| 2003/0028785 A1 | 2/2003 | Pak et al. | |
| 2003/0033536 A1 | 2/2003 | Pak et al. | |
| 2003/0065793 A1 | 4/2003 | Kouznetsov et al. | |
| 2003/0079145 A1 | 4/2003 | Kouznetsov et al. | |
| 2003/0084377 A1 | 5/2003 | Parks et al. | |
| 2003/0163471 A1 | 8/2003 | Shah | |
| 2003/0163702 A1 | 8/2003 | Vigue et al. | |
| 2003/0200300 A1 | 10/2003 | Melchione et al. | |
| 2003/0233483 A1 | 12/2003 | Melchione et al. | |
| 2003/0233551 A1 | 12/2003 | Kouznetsov et al. | |
| 2004/0006586 A1 | 1/2004 | Melchione et al. | |
| 2004/0019889 A1 | 1/2004 | Melchione et al. | |
| 2004/0073903 A1 | 4/2004 | Melchione et al. | |
| 2004/0153703 A1 | 8/2004 | Vigue | |
| 2004/0268120 A1 | 12/2004 | Mirtal et al. | |
| 2005/0004838 A1 | 1/2005 | Perkowski et al. | |
| 2005/0188370 A1 | 8/2005 | Kouznetsov et al. | |

FOREIGN PATENT DOCUMENTS

| | | |
|---|---|---|
| EP | 1 031 922 A2 | 8/2000 |
| GB | 2 333 865 | 8/1999 |
| WO | WO 02/065282 A2 | 8/2002 |
| WO | WO 03/012644 A1 | 2/2003 |

OTHER PUBLICATIONS

David L. Margulius "Next-Gen Distributed Computing," <http://www.infoworld.com/articles/fe/xml/02/04/01/020401febctci.html>, Mar. 29, 2002.

McAfee First Aid 2000 User's Guide, issued May 1999.

"About Distribution Units," http://msdn.microsoft.com/workshop/delivery/download/overview/units.asp, 3 pages, visited Apr. 1, 2002.

"ActiveX Control," http://searchwinn2000.techtarget.com/s?efiniti?n/0,,sid1_gci211522,00.html, 2 pages, visited Mar. 29, 2002.

"ActiveX or How To Put Nuclear Bombs in Web Pages," http://www.halcyon.com/mclain/Activex/, 3 pages, visited Mar. 29, 2002.

Breese, "About (computer) virii," http://www.networking.tzo.com/net/briefs.virii.asp, 3 pages, visited Mar. 29, 2002.

"BrowserWatch ActiveX Arena!" http://browserwatch.internet.com/Activex/Activex-big.html, 42 pages, visited Mar. 29, 2002.

"Frequently Asked Question," http://www.placeware.com/support/faqs/1430.html, 2 pages, visited Mar. 29, 2002.

"Improving Productivity & Lowering Costs Through Asset Management and The Use of Network Management Tools," NetOctopus The Comprehensive System Administration Solution, 11 pages, 1999.

"Installing and Using The Summon Windows 95 Push Install," http:/netsys.syr.edu/micnet/sum?n_tech/push95.htm, 4 pages, visited Mar. 27, 2002.

"Installing VirusScan ASaP," http://www.mcafeeasap.com/content/virusscan_asap/installing_virusscan._sp, 2 pages, visited Apr. 1, 2002.

"Internet Component Download," http://msdn.microsoft.com/workshop/delivery/download/overview/entry.asp?frame=true, 3 pages, visited Mar. 29, 2002.

McLain, "Runner Control—What's Runner?" http://www.halcyon.com/mclain/ActiveX/Runner/welcome.html, 1 page, visited Mar. 29, 2002.

"On-Line Data Recovery Concept," http://www.finaldata.com/english/recover/recover2_3.htm, 1 page, visited Mar. 29, 2002.

"Push Media," http://foldoc.doc.ic.?c.uk/foldoc/cgi?push+medi, 1 page, visited Mar. 28, 2002.

"Uniform Resource Locator," http://foldoc.doc.ic.?c.uk/fpldoc/foldoc.cgi?query=url, 1 page, visited Mar. 29, 2002.

"Using INF Files," http://msdn.microsoft.com/workshop/delivery/download/overview/inf.asp, 2 pages, Apr. 1, 2002.

"VirusScan ASaP Push Install Utility," http://www.mcafeeasap.com/content/virusscan_asap/virusscan_push.asp, 1 page, visited Apr. 1, 2002.

"VirusScan ASaP Silent Install Pacakage," http://www.mcafeeasap.com/content/virusscan_asap/virusscan_sfx.asp, 2 pages, visited Mar. 28, 2002.

"WebGuest Web Glossary," http://www.google.com/search?q=c?che:p5L8LL?r?6IC:www.webquest.com/glossq.html+query+str. . . , 1 page, visited Mar. 29, 2002.

"netOctopus Solutions: Smart Systems Management for Multi-Platform Environments," netopia® Product Brief, 3 pages, 1999.

"netOctopus: The Comprehensive System Administration Solution,"netopia®, 11 pages, 1999.

Phillips, "Microsoft Windows XP: How to Run Legacy Application Using WIndows XP," Microsoft Corporation, 24 pages, Nov. 2001.

Templeton, "Microsoft Operations Manager 2000," Presentation by Microsoft New Zealand, 26 pages, Aug. 2001.

"VirusScan ASaP, Managed Anti-Virus Service for the Desktop Environment," McAfee, 56 pages, Mar. 29, 2002.

"Using Instant Updater Your McAfee Product," McAfee Website, 1 page, visited Mar. 29, 2002.

"Error: 'Unable to run NAIKA.EXE'," McAfee Website, visited Mar. 29, 2002.

"Central Doesn't Open When I Run the Program," McAfee website, visited Mar. 29, 2002.

"How do I Test My VirusScan Installation? (Eicar)," McAfee website, visited Mar. 29, 2002.

"How to Set Firewall for Dial-up, DSL or Cable Modems," McAfee website, visited Mar. 29, 2002.

"Windows Appears to Hang at Startup on the Vshield Splash Screen," McAfee website, visited Mar. 29, 2002.
"My Computer Locks Up After Installing VirusScan," McAfee website, visited Mar. 29, 2002.
"Instructions on Upgrading VirusScan to Version 6," McAfee website, visited Mar. 29, 2002.
"Firewall Protection,"McAfee ASaP Website, visited Mar. 29, 2002.
"A Complete Firewall Security Service that Monitors, Controls and Logs your Personal Computer's Network Activity," McAfee ASaP Website, visited Mar. 29, 2002.
"Free Trial," McAfee ASaP Website, visited Mar. 29, 2002.
"Features/Benefits," McAfee ASaP Website, visited Mar. 29, 2002.
McAfee ASaP Graphics ("System 1 Boots. . ."), McAfee ASaP Website, 3 1-page printouts, visited Mar. 29, 2002.
"Technical Frequently Asked Question," McAfee ASaP Website, visited Mar. 29, 2002.
"VirusScan Managed Service Upgrade," McAfee ASaP Website, visited Mar. 29, 2002.
"An Online Service that Stops E-mail Borne Viruses and Infected Attachments before they enter Your Network," McAfee ASaP Website, visited Mar. 29, 2002.
"Features and Benefits," McAfee ASaP Website, visited Mar. 29, 2002.
"General Frequently Asked Question," McAfee ASaP Website, visited Mar. 29, 2002.
"Technical Frequently Asked Question," McAfee ASaP Website, visited Mar. 29, 2002.
"VirusScreen ASaP," McAfee ASaP Website, visited Mar. 29, 2002.
"VirusScreen ASaP System SnapShot," McAfee ASaP Website, 5 1-page printouts, visited Mar. 29, 2002.
"Frequently Asked Question," McAfee ASaP Website, 3 pages, visited Mar. 29, 2002.
"VirusScan ASaP—FAQs," McAfee Support Website, 44 pages, visited Mar. 29, 2002.
Fisher, "e-Policy Orchestrator Walk Through", Version 1.91, 53 pages, Mar. 21, 2002.
"ePolicy Orchestrator," http://www.mcafeeb2b.com/products/epolicy/default.asp, 3 pages, visited Mar. 21, 2002.
"McAfee ePolicy Orchestrator," McAfee A Network Associates Company, 2 pages, 2001.
Marks, "McAfee Hits It Big with ASP Services," http://www.aspscope.com/articles/1239.htm, 2 pages, visited Mar. 21, 2002.
"McAfee Service Provider Program," McAfee, 6 pages, 2000.
"Trend Micro's InterScan VirusWall First Antivirus Product to be SunTon[sm ] Certified for ASP Deployment," http://www.antivirus.com/corporate/media/2000/pr071800.htm, 3 pages, visited Mar. 21, 2002.
"Hosting Partner Program," http://www.mcafeeasap.com/content/partners/sp1.asp, 1 page, Mar. 21, 2002.
"A Web-based Managed and Updated Anti-Virus Service for the Entire Desktop Environment," http://www.mcafeeasap.com/content/virusscan_asap/default.asp, 1 page, visited Mar. 21, 2002.
"Application Portals: Maximizing Existing Computing Resources in a Changing Business and Technology Environement," Delphi Group, 12 pages, Apr. 2001.
"McAfee's ePolicy Orchestrator Eliminates the Holes in the Enterprise's Anti-Virus Armor," Aberdeen Group, Inc., 8 pages, 2001.

"ePolicy Orchestrator," McAfee, 16 pages, Oct. 2001.
"A Web-based, Managed and Updated Anti-Virus Service for the Entire Desktop Environment," http://www.mcafeeasap.com/content/virusscan_asap/default.asp, 1 page, Mar. 29, 2002.
"Virus Protection," http:mcafeeasap.com/content/managed_services/default.asp, 2 pages, visited Mar. 29, 2002.
"Security HQ," hq.mcafeeasap.com/DEFAULT.asp, 2 pages, visited Mar. 29, 2002.
"McAfee ASaP Partners," http://www.mcafeeasap.com/content/partners/default.asp, 1 page, visited Mar. 29, 2002.
"McAfee ASaP Leverages the Internet to Manage Complex Security Functions for You," http://wwmcafeeasap.com/content/about/default.asp, 1 page, visited Mar. 29, 2002.
"Features and Benefits," http://www.mcafeeasap.com/content/virusscan_asap/features.asp, 2 pages, visited Mar. 29, 2002.
"VirusScan ASaP FAQ," http://www.mcafeeasap.com/content/virusscan_asap/faq.asp, 3 pages, visited Mar. 29, 2002.
"McAfee ASaP introduces Rumor—a new ASaP Technology that uses file sharing distribution to manage anti-virus and firewall configurations updates," http://www.mcafeeasap.com/content/virusscan_asap/rumor.asp, 1 page, visited Mar. 29, 2002.
"Managing VirusScan ASaP," http://www.mcafeeasap.com/content/virusscan_asap/managing_virusscan.asp, 4 pages, visited Mar. 29, 2002.
"Installing VirusScan ASaP," http://www.mcafeeasap.com/content/virusscan_asap/installing_virusscan.asp, 2 pages, visited Mar. 29, 2002.
"VirusScan ASaP: How it Works," http://www.mcafeeasap.com/content/virusscan_asap/howitworks.asp, 1 pages visited Mar. 29, 2002.
"VirusScan ASaP Sample Reports," http://www.mcafeeasap.com/samplereport/virusscan/vslandingsamplereport.asp, 1 page, visited Mar. 29, 2002.
"Custom Anti-Virus Protection," http://www.mcafeeasap.com/content/managed_services/vscanmanage.asp, 1 page visited Mar. 29, 2002.
"Customer Queries," http://www.mcafeeb2b.com/naicommon/services/customer-support/customer-queries.asp, 2 pages visited Mar. 29, 2002.
"McAfee PrimeSupport," http://www.mcafeeb2b.com/support/primesupport/default.asp,2 pages visited Mar. 29, 2002.
"McAfee VirusScan, Administrator's Guide,"Version 4.5, 208 pages, Mar. 2000.
"McAfee VirusScan TC, Administrator's Guide," Version 6.0, 91 pages, Sep. 2000.
"Virex, Anti-virus software for Macintosh computers, User's Guide," Version 6.0, 116 pages, Sep. 1999.
"MS-DOS," reference.com, 5 pages, 2006, recounting events from 1980-2000 (www.reference.com/browse/wiki/MS-DOS).
Miser, Using Mac OS X Special Edition Que sections: "Solving Problems" and "Maintaining Your Mac," Dec. 5, 2001, 22 pages.
Milojicic et al., "Peer-to-Peer Computing," HP Invent, Mar. 2002, 52 pages.
Salamone, "Electronic Software Distribution: Diamond in the Rough," *Data Communications International*, McGraw Hill, New York, vol. 22, No. 4, pp. 109-110, 113-114, 116, Mar. 1993.

* cited by examiner

| GROUP EDITOR |||
|---|---|---|
| GROUP<br>(# OF COMPUTERS) | GROUP: SALES   POLICY: SALES POLICY ||
| UNASSIGNED (5) | | |
| LAB (3) | COMPUTER  OS         DOMAIN  SELECTED<br>SLS-10    WIN 9X    PDX        ☐<br>SLS-04    WIN NT    PDX        ☐<br>SLS-05    WIN NT    PDX        ☒<br>SLS-07    WIN NT    PDX        ☐<br>SLS-08    OS X      PDX        ☐ ||
| ACCOUNTING (5) |||
| SALES (273) |||
| IT (10) |||
| | ( ADD )    ( REMOVE ) ||
| ( ADD GROUP ) |||
| ( DELETE GROUP ) | ( APPLY ) ||

| POLICY EDITOR |||
|---|---|---|
| POLICY LIST | POLICY DETAILS  AGENT DETAILS SCHEDULED TASKS  ASSOCIATED GROUPS ||
| SALES POLICY LAB POLICY DEFAULT POLICY | POLICY DETAILS ||
| ^ | POLICY NAME: | SALES POLICY |
| ^ | LOCALE: | ENGLISH - U.S. ▼ |
| ^ | RELEASE STATE: | LIVE ▼ |
| ADD POLICY DELETE POLICY | APPLY ||

FIG. 17A

VRASPAGENTPOLICIES

| COL NAME | TYPE | LEN | NULLS? | DEFAULT VAL | IDEN |
|---|---|---|---|---|---|
| 🔑 AGENTPOLICYID | INT | 4 | | | ✓ |
| POLICYID | UNIQUEIDENTIFIER | 16 | | | |
| SHOWAGENTUI | BIT | 1 | | (1) | |
| SHOWMENUEXIT | BIT | 1 | | (1) | |

FK_VRASPAGENTPOLICIES_VRASPPOLICIES (AA)

VRASPDISTRIBUTEDSERVERPOLICIES

| COL NAME | TYPE | LEN | NULLS? | DEFAULT VAL | IDEN |
|---|---|---|---|---|---|
| 🔑 DISTRIBUTEDSERVERPOLICYID | INT | 4 | | | ✓ |
| POLICYID | UNIQUEIDENTIFIER | 16 | | | |
| ENABLEFILESHARING | BIT | 1 | | (1) | |
| ENABLEPROXY | BIT | 1 | | (1) | |
| LASTMODIFIED | DATETIME | 8 | | (GETUTCDATE()) | |

FK_VRASPDISTRIBUTEDSERVERPOLICIES_VRASPPOLICIES (BB)

VRASPUPDATEPOLICIES

| COL NAME | TYPE | LEN | NULLS? | DEFAULT VAL | IDEN |
|---|---|---|---|---|---|
| 🔑 UPDATEPOLICYID | INT | 4 | | | ✓ |
| POLICYID | UNIQUEIDENTIFIER | 16 | | | |
| UPDATEINTERVAL | SMALLINT | 2 | | (15) | |
| LASTMODIFIED | DATETIME | 8 | | (GETUTCDATE()) | |

FK_VRASPUPDATEPOLICIES_VRASPPOLICIES (CC)

VRASPUPLOADPOLICIES

| COL NAME | TYPE | LEN | NULLS? | DEFAULT VAL | IDEN |
|---|---|---|---|---|---|
| 🔑 UPLOADPOLICYID | INT | 4 | | | ✓ |
| POLICYID | UNIQUEIDENTIFIER | 16 | | | |
| UPLOADINTERVAL | SMALLINT | 2 | | (15) | |
| LASTMODIFIED | DATETIME | 8 | | (GETUTCDATE()) | |

FK_VRASPUPLOADPOLICIES_VRASPPOLICIES (DD)

FIG. 17B

VRASPODSPOLICIES

| COL NAME | TYPE | LEN | NULLS? | DEFAULT VAL | IDEN |
|---|---|---|---|---|---|
| 🔑 ODSPOLICYID | INT | 4 | | | ✓ |
| POLICYID | UNIQUEID | 16 | | | |
| DEFAULTSCANSETTYPEID | TINYINT | 1 | | (1) | |
| EXCLUSIONLIST | NVARCHAR | 200 | ✓ | | |
| VIRUSNOTIFYEMAIL | NVARCHAR | 100 | ✓ | | |
| LASTMODIFIED | DATETIME | 8 | | (GETUTCDATE()) | |

FK_VRASPODSPOLICIES_VRASPDEFAULTSCANSETTYPES

FK_VRASPODSPOLICIES_VRASPPOLICIES (FF)

VRASPDEFAULTSCANSETTYPES

| COL NAME | TYPE | LEN |
|---|---|---|
| DEFAULTSCANSETTYPEID | TINYINT | 1 |
| NAME | NVARCHAR | 50 |

VRASPONACCESSSTATETYPES

| COL NAME | TYPE | LEN |
|---|---|---|
| ONACCESSSTATETYPEID | TINYINT | 1 |
| NAME | NVARCHAR | 50 |

FK_VRASPOASPOLICIES_VRASPDEFAULTSCANSETTYPES

FK_VRASPOASPOLICIES_VRASPONACCESSSTATETYPES

VRASPOASPOLICIES

| COL NAME | TYPE | LEN | N'S? | DEFAULT VAL | IDEN |
|---|---|---|---|---|---|
| 🔑 OASPOLICYID | INT | 4 | | | ✓ |
| POLICYID | UNIQUEID | 16 | | | |
| ONACCESSSTATETYPEID | TINYINT | 1 | | (1) | |
| DEFAULTSCANSETTYPEID | TINYINT | 1 | | (1) | |
| EXCLUSION LIST | NVARCHAR | 200 | ✓ | | |
| VIRUSNOTIFYEMAIL | NVARCHAR | 100 | ✓ | | |
| LASTMODIFIED | DATETIME | 8 | | (GETUTCDATE()) | |

FK_VRASPOASPOLICIES_VRASPPOLICIES (EE)

FIG. 17D

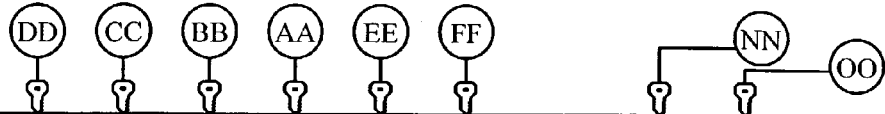

VRASPPOLICIES

| COL NAME | TYPE | LEN | NULLS? | DEFAULT VAL | IDEN |
|---|---|---|---|---|---|
| 🔑 POLICYID | UNIQUEIDENTIFIER | 16 | | (NEWID()) | |
| ORGID | UNIQUEIDENTIFIER | 16 | | | |
| LICENSEID | UNIQUEIDENTIFIER | 16 | | | |
| RELEASESTATEID | TINYINT | 1 | | (4) | |
| LOCALEID | NVARCHAR | 4 | | | |
| NAME | NVARCHAR | 50 | | (N'DEFAULT POLICY') | |

FK_VRASPPOLICIES_LICENSES    FK_VRASPPOLICIES_ORGANIZATIONS

FK_VRASPPOLICIES_RELEASESTATES

ORGANIZATIONS

| COL NAME | TYPE | LEN | NULLS? | DEFAULT VAL | IDEN |
|---|---|---|---|---|---|
| 🔑 ORGID | UNIQUEIDENTIFIER | 16 | | (NEWID()) | |
| OEMID | NVARCHAR | 4 | | (N'SRES') | |
| RELEASETHRESHOLD | TINYINT | 1 | | (100) | |
| NAME | NVARCHAR | 100 | | | |

FK_ORGANIZATIONS_OEM

OEM

| COL NAME | TYPE | LEN | NULLS? | DEFAULT VAL | IDEN |
|---|---|---|---|---|---|
| 🔑 OEMID | NVARCHAR | 4 | | (N'NEWID()') | |
| NAME | NVARCHAR | 100 | | | |

FIG. 17J

| VRASPVIRUSEVENTSLKP | | | | | |
|---|---|---|---|---|---|
| COL NAME | TYPE | LEN | NULLS? | DEFAULT VAL | IDEN |
| EVENTID | INT | 4 | | | |
| ORGID | UNIQUEIDENTIFIER | 16 | | | |
| GROUPID | UNIQUEIDENTIFIER | 16 | | | |
| NODEID | UNIQUEIDENTIFIER | 16 | | | |
| ORGNAME | NVARCHAR | 100 | | | |
| GROUPNAME | NVARCHAR | 50 | | | |
| NODENAME | NVARCHAR | 100 | | | |
| FILENAME | NVARCHAR | 300 | ✓ | | |
| VIRUSNAME | NVARCHAR | 50 | ✓ | | |
| STATUS | NVARCHAR | 50 | ✓ | | |
| VIRUSTYPE | NVARCHAR | 50 | ✓ | | |
| DETECTEDMETHOD | NVARCHAR | 50 | ✓ | | |
| CAPTUREDON | DATETIME | 8 | ✓ | | |
| UTCOFFSET | NCHAR | 6 | ✓ | | |
| CLEANABLE | BIT | 1 | ✓ | | |

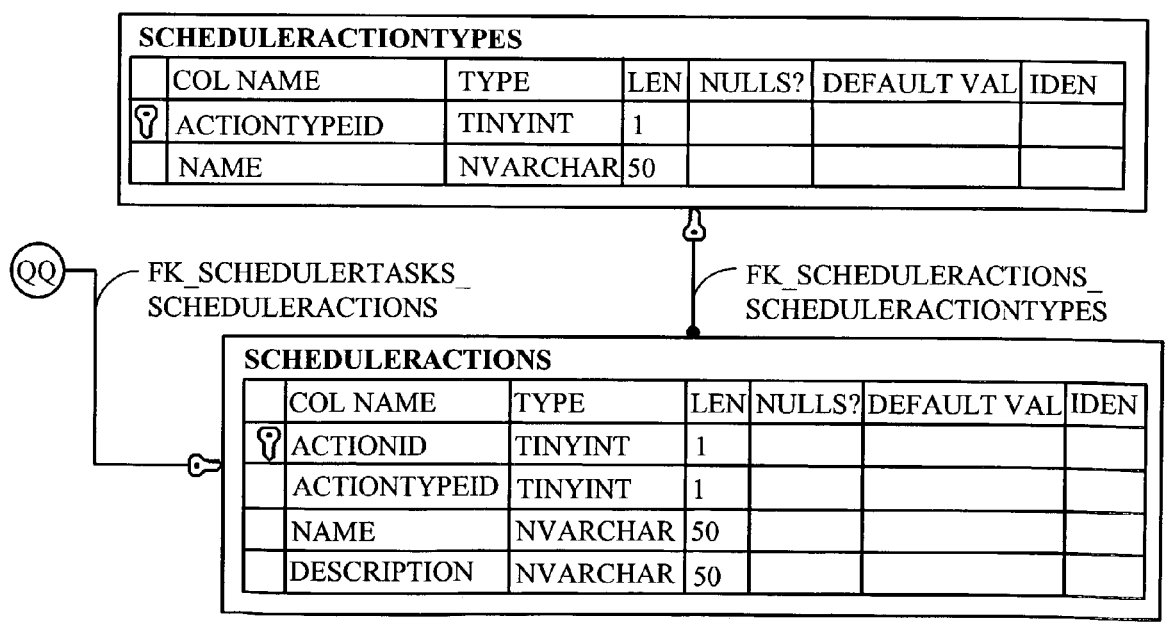

SOFTWARE ADMINISTRATION IN AN APPLICATION SERVICE PROVIDER SCENARIO VIA CONFIGURATION DIRECTIVES

PRIORITY CLAIM

This application claims the benefit of U.S. Provisional Patent Application No. 60/375,216, filed Apr. 23, 2002, which is hereby incorporated herein by reference.

CROSS-REFERENCE TO OTHER APPLICATIONS

The U.S. provisional patent applications No. 60/375,215, Melchione et al., entitled, "Software Distribution via Stages"; No. 60/375,176, Vigue et al., entitled, "Fault-tolerant Distributed Computing Applications"; No. 60/375,174, Melchione et al., entitled, "Providing Access To Software Over a Network via Keys"; No. 60/375,154, Melchione et al., entitled, "Distributed Server Software Distribution,"; and No. 60/375,210, Melchione et al., entitled, "Executing Software In A Network Environment"; all filed Apr. 23, 2002, are hereby incorporated herein by reference.

TECHNICAL FIELD

The invention relates to software administration and, more particularly, to software administration in an application service provider scenario.

COPYRIGHT AUTHORIZATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Organizations have become increasingly dependent on computers to maintain high levels of productivity. Administering a large number of computers in an organization can be a burdensome task. The burden is further compounded when the computers are scattered throughout various locations and departments of the organization.

One particularly challenging aspect of computer administration relates to administering software on computers. It may be desirable to configure software based on a variety of circumstances. The circumstances can change over time, and circumstances can vary from one location to another or from one computer to another. Further, at some point, the software may need to be upgraded.

Tracking the configuration of a number of computers with various configurations can be overwhelming. And, in addition to tracking the configurations, changes to the configurations may be desired on a regular basis. Implementing such changes can consume inordinate amounts of resources. Accordingly, improvements in the field of software administration are needed.

SUMMARY

The above issues can be problematic to administrators, whether they manage a small network or an enterprise having thousands of computers spread over multiple locations.

In various embodiments described herein, software administration can be achieved via an application service provider scenario. For example, configuration directives for a set of computers can be collected via an application service provider scenario. Agent software running at the computers can periodically contact a data center having access to a database in which the configuration directives are stored.

Responsive to communications from agents at the computers, the configuration directives can be implemented. A variety of software administration configuration directives can be implemented. For example, settings or preferences related to administered software can be configured; software designated as to be installed at a computer can be installed at a computer; file sharing (e.g., with other agent software) can be activated or deactivated at a computer; and a user interface to be presented at a computer for administered software can be configured or hidden.

A data center can provide software administration services via an application service provider scenario for a plurality of organizations. For example, a plurality of separate customers can enter into separate agreements with an application service provider vendor. Or, a plurality of vendors can sell services from a single application service provider to different customers.

To facilitate software administration, computers can be placed into named groups, and configuration directives can be specified for the groups. In this way, software can be administered for a large number of computers more easily.

Also to facilitate software administration, one or more configuration directives can be placed into a named set. Such a set is sometimes called a "policy." The configuration directives in the named set can be associated with a node or group by associating the named set with a node or group. In this way, the amount of work done to associate configuration directives with nodes can be reduced.

In one arrangement, agent software at computers polls a data center to pull configuration information or implement configuration directives. Polling can be accomplished via an HTTP-based protocol and can thus be accomplished even if a firewall blocking non-HTTP-based communications is between the computers and the data center.

Configuration directives can also be received via an HTTP-based protocol. Thus, software administration can be accomplished even if a firewall is between a computer operated by an administrator and the data center.

In certain described examples, the software being administered is anti-virus software. New releases of anti-virus software can be automatically provided according to configuration directives received via an application service provider scenario using an HTTP-based protocol through a firewall.

Responsibilities for various portions of the system can be divided so that an application service provider controls various aspects to relieve software administrators of various duties.

Additional features and advantages will be made apparent from the following detailed description of illustrated embodiments, which proceeds with reference to the accompanying drawings.

BRIEF DESCRIPTION OF THE DRAWINGS

FIG. 12 is a screen shot showing an exemplary user interface for manipulating groups.

FIG. 13 is a screen shot showing an exemplary user interface for manipulating policies.

FIGS. 17A-17J show an exemplary database schema for use with an implementation of technologies described herein.

DETAILED DESCRIPTION

Application Service Provider Overview

The embodiments described herein can be implemented in an application service provider scenario. In particular embodiments, software administration can be accomplished via an application service provider scenario.

Figure 1:
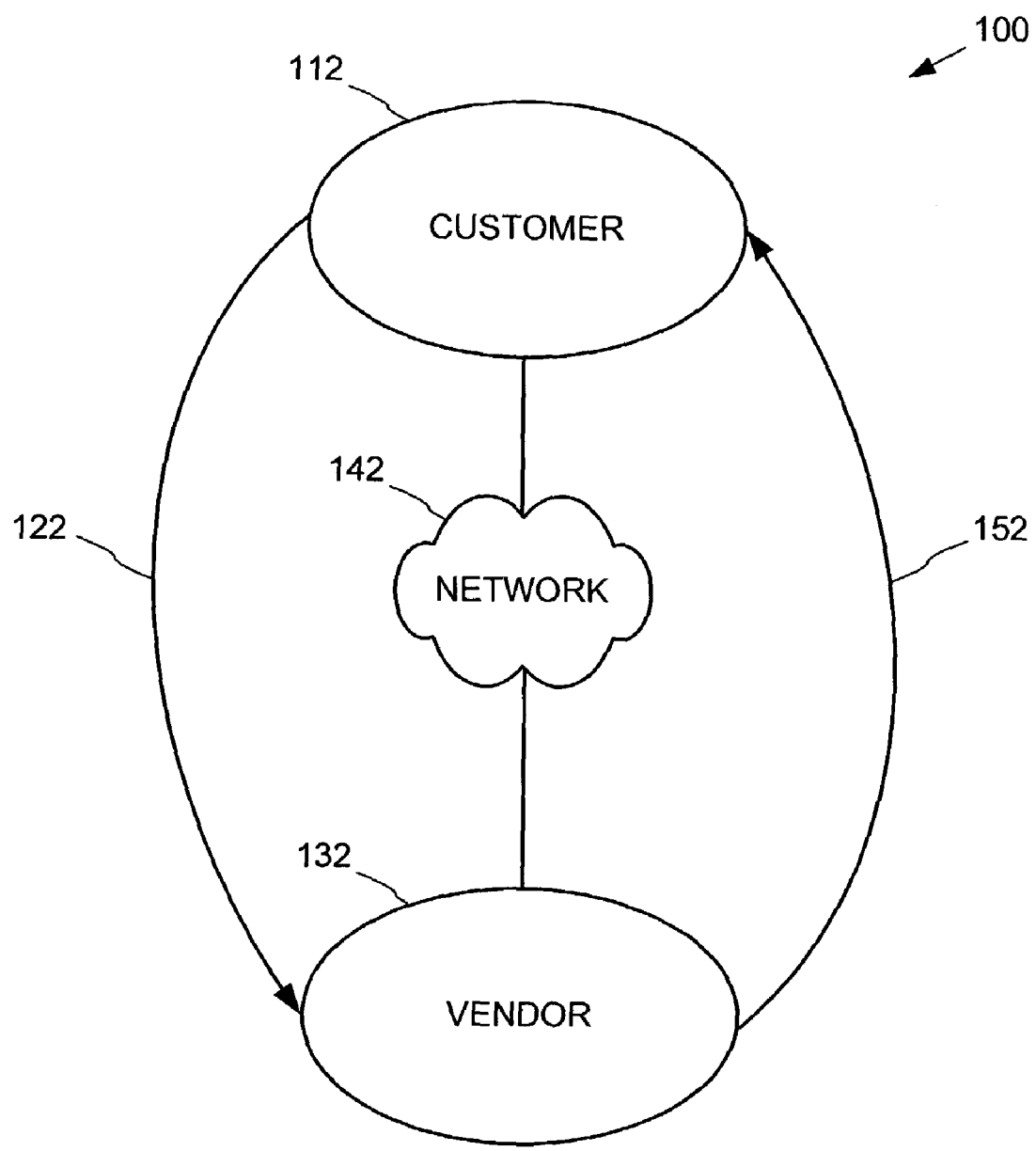
FIG. 1 is an illustration of an exemplary application service provider scenario.

An exemplary application service provider scenario 100 is shown in FIG. 1. In the scenario 100, a customer 112 sends requests 122 for application services to an application service provider vendor 132 via a network 142. In response, the vendor 132 provides application services 152 via the network 142. The application services 152 can take many forms for accomplishing computing tasks related to a software application or other software.

To accomplish the arrangement shown, a variety of approaches can be implemented. For example, the application services can include delivery of graphical user interface elements (e.g., hyperlinks, graphical checkboxes, graphical pushbuttons, and graphical form fields) which can be manipulated by a pointing device such as a mouse. Other application services can take other forms, such as sending directives or other communications to devices of the vendor 132.

To accomplish delivery of the application services 152, a customer 112 can use client software such as a web browser to access a data center associated with the vendor 132 via a web protocol such as an HTTP-based protocol (e.g., HTTP or HTTPS). Requests for services can be accomplished by activating user interface elements (e.g., those acquired by an application service or otherwise) or automatically (e.g., periodically or as otherwise scheduled) by software. In such an arrangement, a variety of networks (e.g., the Internet) can be used to deliver the application services (e.g., web pages conforming to HTML or some extension thereof) 152 in response to the requests. One or more clients can be executed on one or more devices having access to the network 142. In some cases, the requests 122 and services 152 can take different forms, including communication to software other than a web browser.

Figure 2:
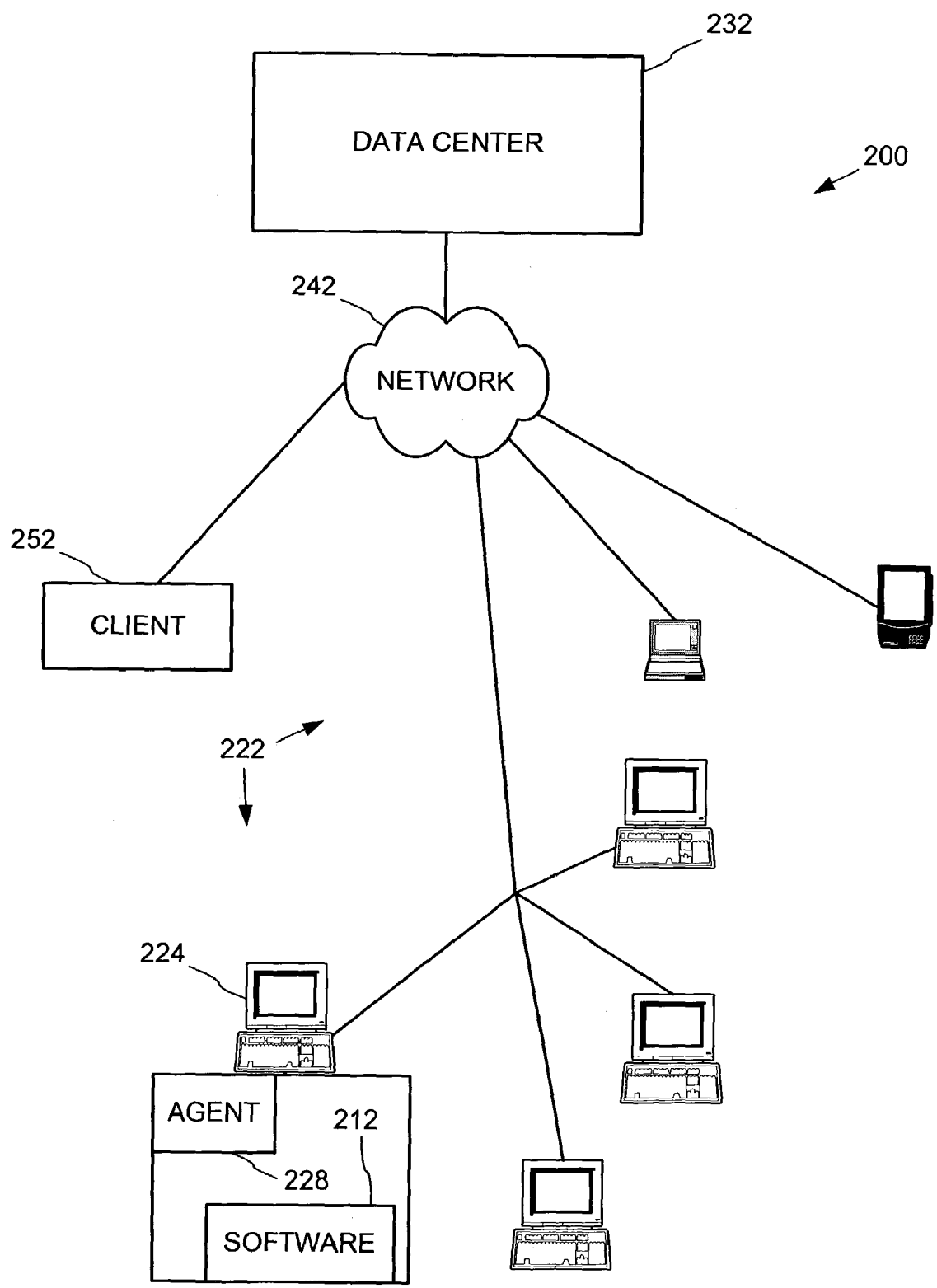
FIG. 2 is an illustration of an exemplary arrangement by which software administration can be accomplished via an application service provider scenario.

The technologies described herein can be used to administer software (e.g., one or more applications) across a set of administered devices via an application services provider scenario. Administration of software can include software installation, software configuration, software management, or some combination thereof. FIG. 2 shows an exemplary arrangement 200 whereby an application service provider provides services for administering software (e.g., administered software 212) across a set of administered devices 222. The administered devices 222 are sometimes called "nodes."

In the arrangement 200, the application service provider provides services for administrating instances of the software 212 via a data center 232. The data center 232 can be an array of hardware at one location or distributed over a variety of locations remote to the customer. Such hardware can include routers, web servers, database servers, mass storage, and other technologies appropriate for providing application services via the network 242. Alternatively, the data center 232 can be located at a customer's site or sites. In some arrangements, the data center 232 can be operated by the customer itself (e.g., by an information technology department of an organization).

The customer can make use of one or more client machines 252 to access the data center 232 via an application service provider scenario. For example, the client machine 252 can execute a web browser, such as Microsoft Internet Explorer, which is marketed by Microsoft Corporation of Redmond, Wash. In some cases, the client machine 252 may also be an administered device 222.

The administered devices 222 can include any of a wide variety of hardware devices, including desktop computers, server computers, notebook computers, handheld devices, programmable peripherals, and mobile telecommunication devices (e.g., mobile telephones). For example, a computer 224 may be a desktop computer running an instance of the administered software 212.

The computer 224 may also include an agent 228 for communicating with the data center 232 to assist in administration of the administered software 212. In an application service provider scenario, the agent 228 can communicate via any number of protocols, including HTTP-based protocols.

The administered devices 222 can run a variety of operating systems, such as the Microsoft Windows family of operating systems marketed by Microsoft Corporation; the Mac OS family of operating systems marketed by Apple Computer Incorporated of Cupertino, Calif.; and others. Various versions of the operating systems can be scattered throughout the devices 222.

The administered software 212 can include one or more applications or other software having any of a variety of business, personal, or entertainment functionality. For example, one or more anti-virus, banking, tax return preparation, farming, travel, database, searching, multimedia, security (e.g., firewall) and educational applications can be administered. Although the example shows that an application can be managed over many nodes, the application can appear on one or more nodes.

In the example, the administered software 212 includes functionality that resides locally to the computer 224. For example, various software components, files, and other items can be acquired by any of a number of methods and reside in a computer-readable medium (e.g., memory, disk, or other computer-readable medium) local to the computer 224. The administered software 212 can include instructions executable by a computer and other supporting information. Various versions of the administered software 212 can appear on the different devices 222, and some of the devices 222 may be configured to not include the software 212.

Figure 3:
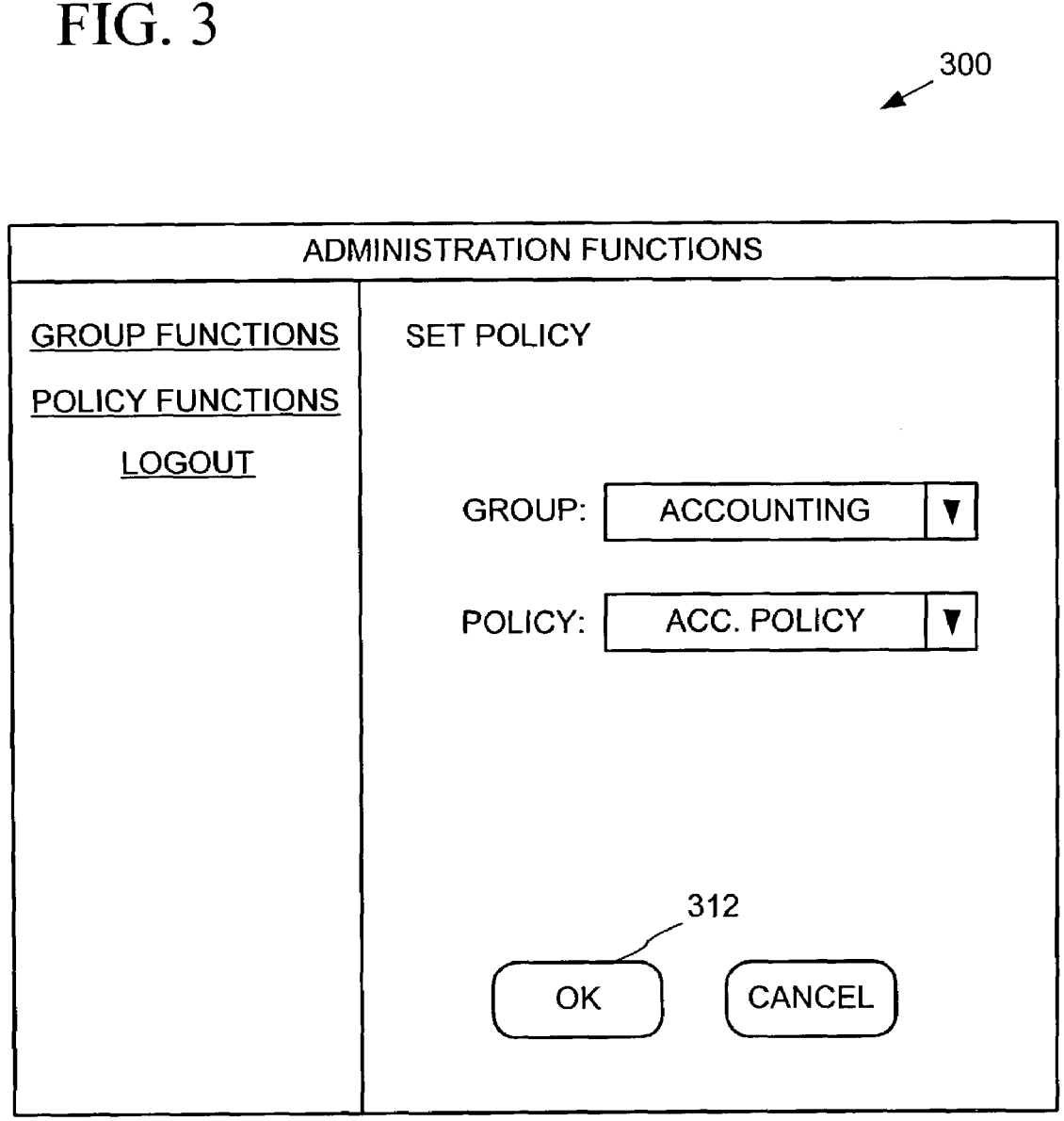
FIG. 3 depicts an exemplary user interface by which software administration can be accomplished in an application service provider scenario.

FIG. 3 shows an exemplary user interface 300 presented at the client machine 252 by which an administrator can administer software for the devices 222 via an application service provider scenario. In the example, one or more directives can be bundled into a set of directives called a "policy." In the example, an administrator is presented with an interface by which a policy can be applied to a group of devices (e.g., a selected subset of the devices 222). In this way, the administrator can control various administration functions (e.g., installation, configuration, and management of the administered software 212) for the devices 222. In the example, the illustrated user interface 300 is presented in a web browser via an Internet connection to a data center (e.g., as shown in FIG. 2) via an HTTP-based protocol.

Activation of a graphical user interface element (e.g., element 312) can cause a request for application services to be sent. For example, application of a policy to a group of devices may result in automated installation, configuration, or management of indicated software for the devices in the group.

In the examples, the data center 232 can be operated by an entity other than the application service provider vendor. For example, the customer may deal directly with the vendor to handle setup and billing for the application services. However, the data center 232 can be managed by another party, such as an entity with technical expertise in application service provider technology.

Figure 4:
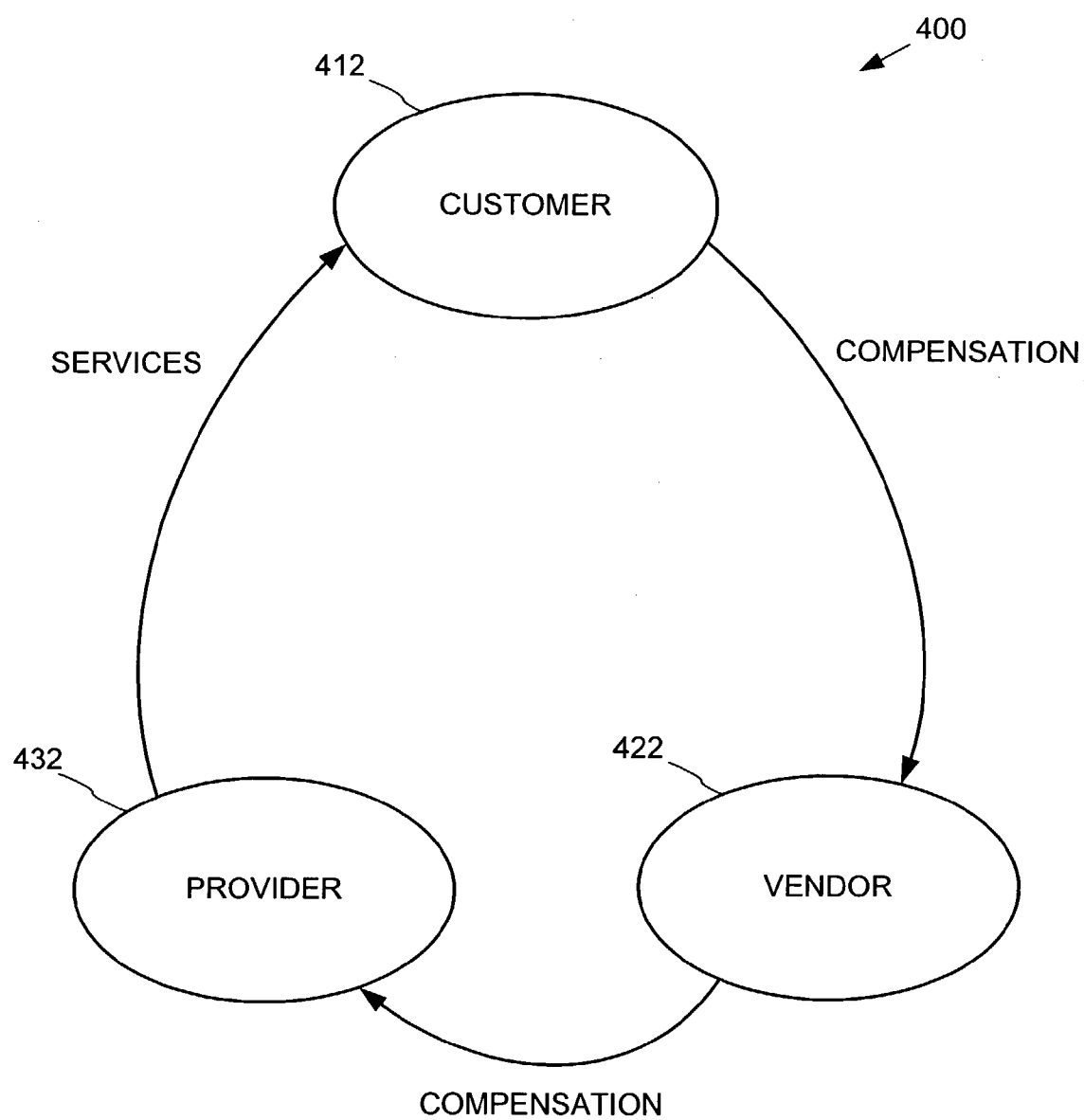
FIG. 4 illustrates an exemplary business relationship accompanying an application service provider scenario, such as that shown in FIG. 1 or 2.

The scenario 100 (FIG. 1) can be accompanied by a business relationship between the customer 112 and the vendor 132. An exemplary relationship 400 between the various entities is shown in FIG. 4. In the example, a customer 412 provides compensation to an application services provider vendor 422. Compensation can take many forms (e.g., a monthly subscription, compensation based on utilized bandwidth, compensation based on number of uses, or some other arrangement (e.g., via contract)). The provider of application services 432 manages the technical details related to providing application services to the customer 412 and is said to "host" the application services. In return, the provider 432 is compensated by the vendor 422.

The relationship 400 can grow out of a variety of situations. For example, it may be that the vendor 422 has a relationship with or is itself a software development entity with a collection of application software desired by the customer 412. The provider 432 can have a relationship with an entity (or itself be an entity) with technical expertise for incorporating the application software into an infrastructure by which the application software can be administered via an application services provider scenario such as that shown in FIG. 2.

Although not shown, other parties may participate in the relationship 400. For example, network connectivity may be provided by another party such as an Internet service provider. In some cases, the vendor 422 and the provider 432 may be the same entity. It is also possible that the customer 412 and the provider 432 be the same entity (e.g., the provider 432 may be the information technology department of a corporate customer 412).

EXAMPLE 1

Exemplary System Overview

Figure 5:
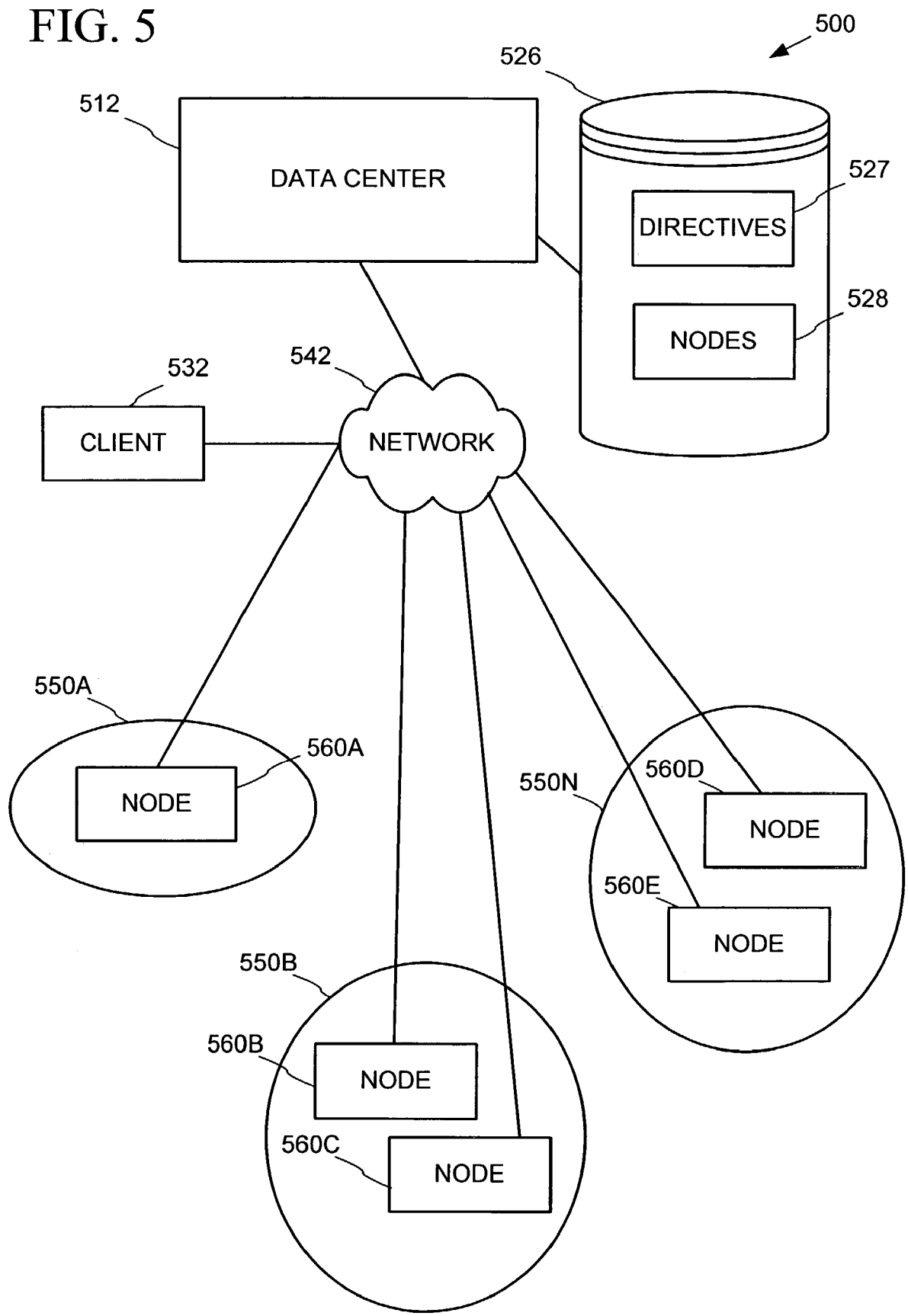
FIG. 5 shows an exemplary system by which software can be administered via an application service provider scenario.

FIG. 5 depicts an overview of an exemplary system 500 by which software can be administered at a plurality of nodes via configuration directives. In the example, a data center 512 provides software administration services for the nodes 560A, 560B, 560C, 560D, and 560E.

The data center 512 keeps a record of configuration directives and nodes in a database 526 (e.g., via the directives table 527 and the nodes table 528). The configuration directives in the database 526 can be associated with one or more of the nodes in the database 526. Other tables can be includes, such as a groups database table or a policies database table.

A client computer 532 accesses the data center 512 via an application service provider scenario. For example, an HTTP-based protocol can be used by which a browser can access the data center 512. In this way, the data center 512 can be accessed by a client computer 532, even if a firewall blocking non-HTTP-based communications is situated between the two.

A user (e.g., an administrator) at the client computer 532 can provide indications of configuration directives to be associated with the nodes, and the indications are recorded in the database 526. The nodes 560A, 560B, 560C, 560D, and 560E being administered can be placed into one or more named logical groups 550A, 550B, and 550M. If desired, the configuration directives in the database 526 can be associated with the nodes via a named group (e.g., via a groups table in the database 526). If desired, a set of directives can be placed in a policy and associated with a group.

The nodes can include agent software that periodically communicates with the data center 512. During such communications, the configuration directives stored in the database 526 can be implemented. For example, software administration commands, parameters, and software can be sent to an agent for use at a node.

The illustrated system can use the Internet for the network 542. Also, communication between the nodes and the data center 512 can be performed via an application service provider scenario (e.g., via the Internet or some other network).

EXAMPLE 2

Exemplary Configuration Directives

A wide variety of configuration directives can be supported by which software can be administered in any of the examples. For example, configuration directives can relate to configuring software preferences or settings, specifying software to be installed, or controlling the behavior of agent software at a node.

A wide variety of software preferences or settings can be altered via configuration directives. For example, operation of the software being administered can be modified or suspended via a configuration directive. Also, any number of parameters used by software can be specified by a configuration directive.

Specifying software to be installed at a node can also be achieved via a configuration directive. For example, a particular software release can be specified as to be installed at a node. Alternatively, a software stage (e.g., "Beta," "Early," or "Live") can be specified. If an appropriate software release is available (e.g., a new "Beta" version), it can be automatically installed at nodes having a configuration directive so indicating.

Behavior of agent software at a node can also be controlled via configuration directives. For example, agent software can be instructed to allow file sharing. In such an arrangement, the agent software can provide software to another node in a distribution-friendly format (e.g., a .CAB file) if requested by another node.

EXAMPLE 3

Incorporating Software Functionality into an ASP Scenario

Figure 6:
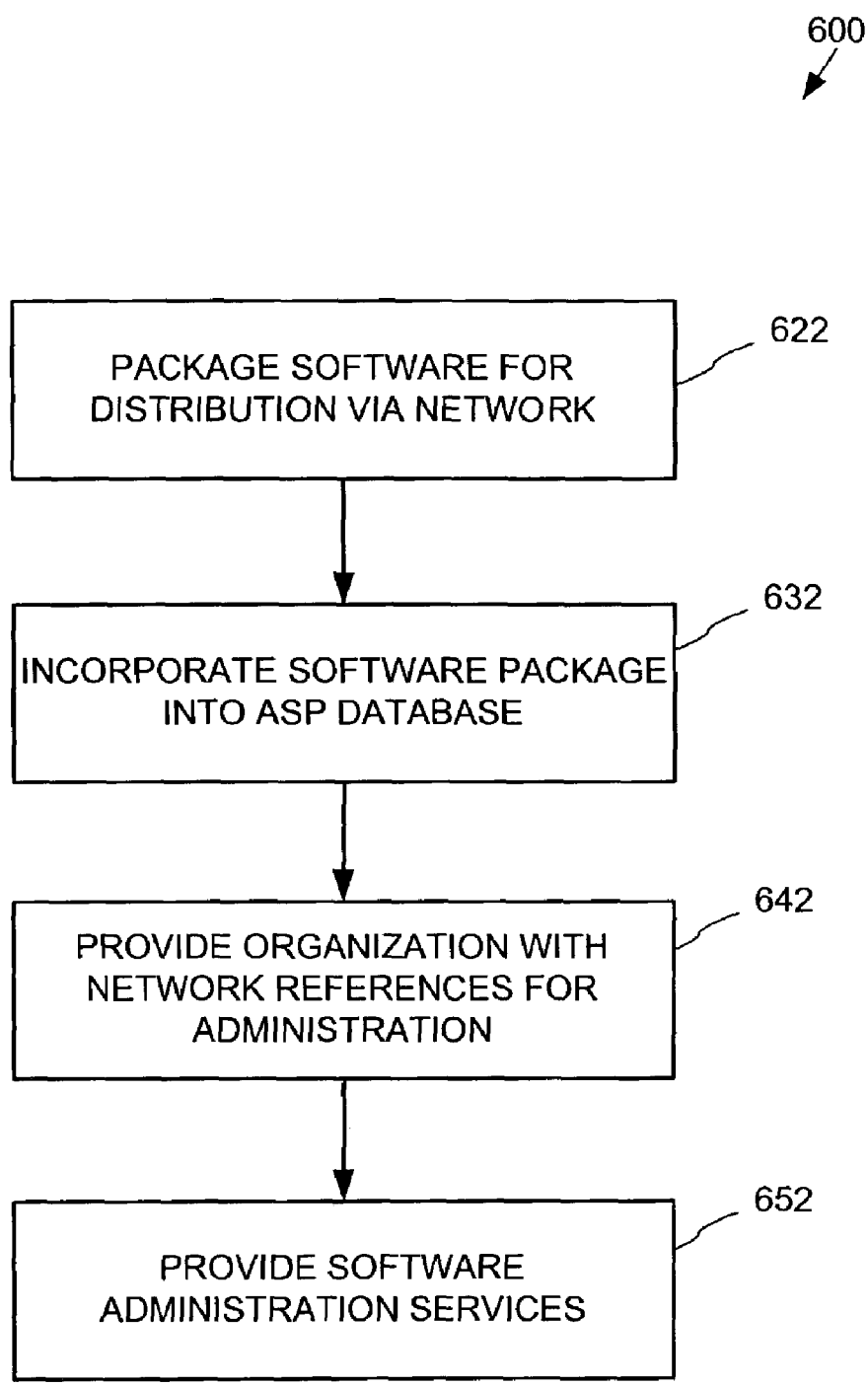
FIG. 6 is a flow chart showing an exemplary method of incorporating software functionality into a system by which the software can be administered via an application service provider scenario.

In some cases, it may be desirable to take an arbitrary piece of software and incorporate it into a system by which the software can be administered via an application service provider scenario. FIG. 6 is a flow chart showing a method 600 for accomplishing such an arrangement. The method 600 can be performed by the developer of the software or an entity specializing in application service provider scenarios which works in tandem with the software developer.

At 622, the software is packaged for distribution over a network. For example, software components and an installation program can be assembled into a package (e.g., according to the CAB file specification of Microsoft Corporation).

At 632, the software package is incorporated into a database maintained by the application service provider (e.g., the database 526). The software package itself may reside at a separate location, and a reference to the package can be incorporated into the database.

At 642, the organization wishing to avail itself of software administration via the application service provider scenario is provided with appropriate network references (e.g., URL's) by which the organization can access the application services for administering the software throughout its locations.

As described below, the network references can be sufficient for accomplishing administration via an application provider service scenario. For example, an administrator can configure a network so that software can be distributed as described herein via the network references. In this way, distribution of software via conventional media (e.g., diskettes or CD's) can be avoided.

At 642, software administration services are provided. For example, configuration directives can be collected via an application service provider scenario, and the directives can be implemented at associated nodes.

EXAMPLE 4

Providing Software Administration Services

Figure 7:
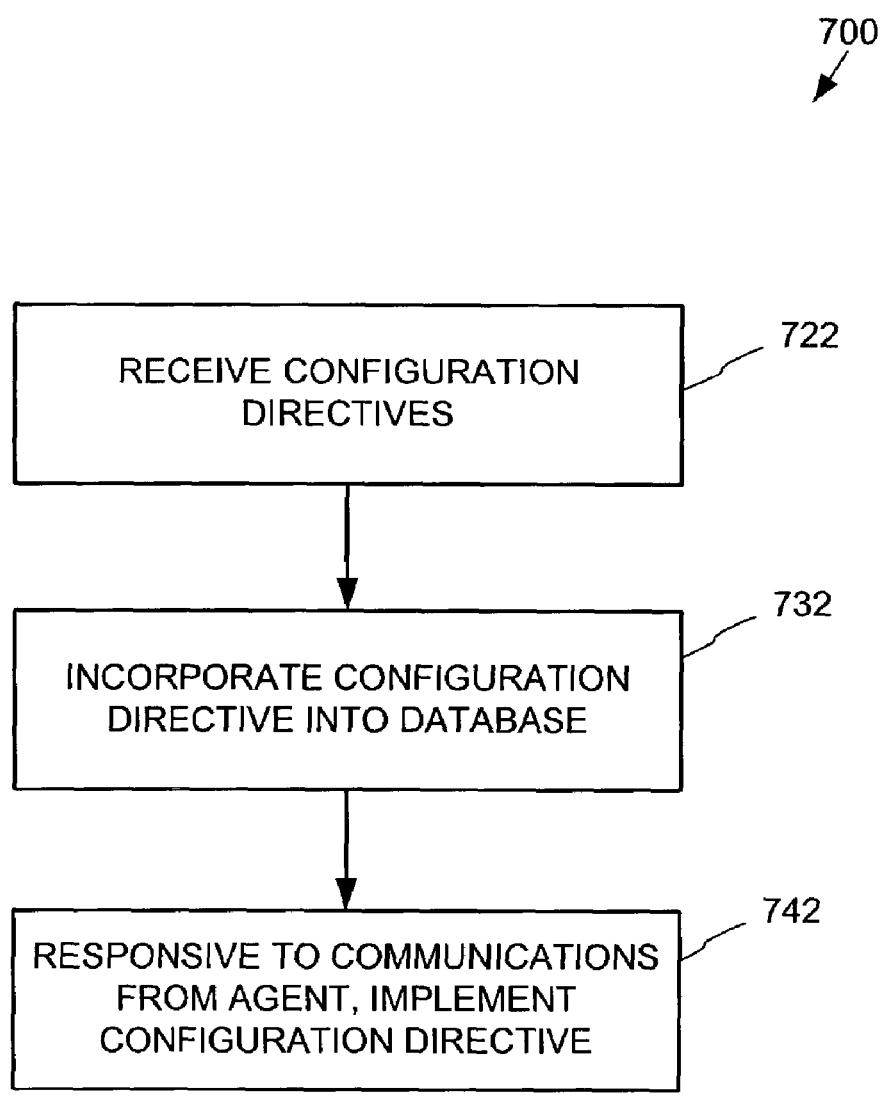
FIG. 7 is a flow chart depicting an exemplary method for accomplishing software administration in an application service provider scenario.

FIG. 7 depicts an exemplary method 700 by which software administration services can be provided in an application service provider scenario. Such a method can be used in conjunction with the method 600 described above.

At 722, configuration directives are received via an application service provider scenario. For example, a client computer running a web browser can access a data center to indicate various configuration directives for nodes. Groups can also be designated, if desired. The configuration directives can be received via an HTTP-based protocol.

At 732, the configuration directives are incorporated into the data center database. For example, various database tables can be modified to reflect the configuration directives received from one or more client computers. Instead of a database, an alternate scheme (e.g., XML) can be used.

At 742, responsive to communications initiated by agents at nodes being administered, the configuration directives can be implemented. For example, if a node polls a data center to see if software is to be installed, access to the software for installation can be provided by the data center. A wide variety of other configuration directives can be implemented. For example, software settings and preferences can be achieved. The communications can be performed via an HTTP-based protocol.

EXAMPLE 5

Application Service Provider Scenarios

Providing software administration services via an application service provider scenario can be challenging because typical network connections include security measures that inhibit various functionality. For example, while it may be possible to install software to a remote machine, doing so over the Internet is typically not possible because organizations employ a firewall by which certain directives originating outside the firewall are not allowed to arrive at machines inside the firewall.

One way to accomplish administration via an application service provider scenario is to use a protocol which has been designated as relatively safe and is typically allowed to pass through the firewall (e.g., an HTTP-based protocol). Some functions related to administration can be accomplished in other ways, such as via distribution of programs embedded in or referred to within relatively safe protocols (e.g., a control conforming to the ActiveX specification of Microsoft Corporation embedded in a web page). Other arrangements are possible. For example, in a scenario in which the application service provider (e.g., an IT department) maintains a data center within the firewall, other protocols may be used. However, an HTTP-based protocol can also be used in such a scenario.

Figure 8:
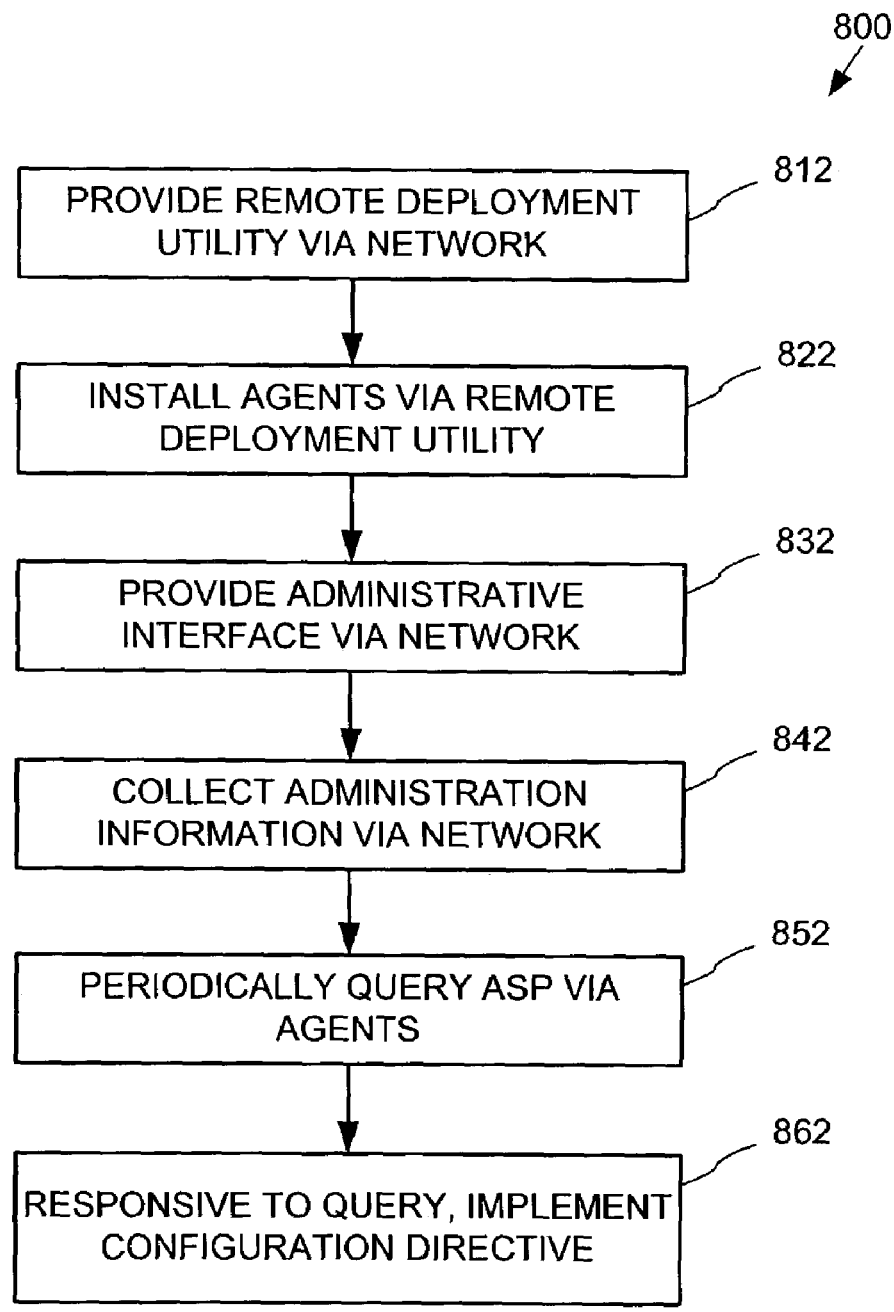
FIG. 8 is a flow chart depicting an exemplary method for accomplishing software administration via an application service provider scenario.

FIG. 8 shows an exemplary method 800 for accomplishing software administration via an application service provider scenario. At 812, a remote deployment utility (e.g., with push functionality) is provided via a network reference (e.g., an URL). For example, the network reference can refer to a location (e.g., a web server) maintained by an application service provider, and an administrator can acquire the remote deployment utility via the location. The remote deployment utility can then be installed behind the firewall so that an administrator can direct installation of appropriate software at nodes within the network (e.g., behind the firewall). Further details relating to the remote deployment utility can be found in U.S. Provisional Application No. 60/375,210, Melchione et al., entitled, "Executing Software In A Network Environment," filed Apr. 23, 2002, which is hereby incorporated herein by reference.

At 822, agent software is installed at nodes to be administered via the remote deployment utility. For example, an administrator can select a list of nodes at which the agent software is to be installed, and the remote deployment utility sends the software to the nodes and arranges for it to be installed at the nodes over a network connection (e.g., without having to physically visit the nodes).

At 832, an administrative user interface is provided via a network reference. For example, the network reference can refer to a location (e.g., a web server) maintained by an application service provider. The administrative user interface can provide a variety of functions by which an administrator can administer software at administered nodes, including specifying configuration directives as described herein.

At 842, administration information is collected from an administrator via the network. For example, various web pages can be presented by which an administrator selects various options and configuration directives. The options and configuration directives can include placing nodes into named groups and associating the named groups with configuration directives. The user interface and administration information can be communicated via an HTTP-based protocol. Accordingly, the information can pass through a firewall.

At 852, the agent software at the administered nodes periodically queries the application service provider (e.g., a data center) to determine what configuration directives need to be carried out at the node. The queries and returned information can be communicated via an HTTP-based protocol. Accordingly, the information can pass through a firewall.

At 862, responsive to a query by a node (e.g., via agent software), one or more configuration directives specified via the application service provider scenario are implemented.

In the case of software distribution, the application service provider can provide a list of software (e.g., listing a software package containing software of a stage as designated by the administrator) that should reside at the node in response to a query by an agent. The agent can pull down the appropriate software (e.g., a software package) and install it at the node.

In the case of an application service provider scenario using the Internet, software administration can thus be accomplished from any device having access to the Internet. Thus, a network behind a firewall can be administered via the Internet, even by an administrator employing a device (e.g., a web browsing computer) outside the firewall.

Figure 9:
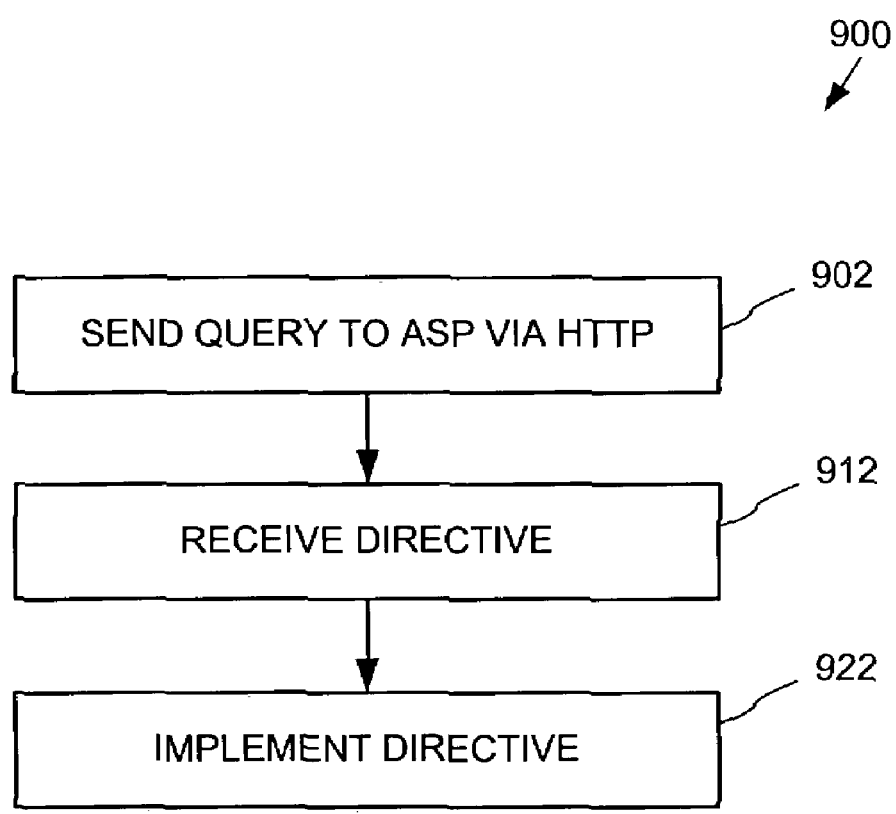
FIG. 9 is a flow chart depicting an exemplary method for accomplishing a software administration function over a network.

FIG. 9 depicts an exemplary method 900 for accomplishing a software administration function over a network. In the example, software is provided to a node behind a firewall. However, other arrangements are possible, such as providing software within the firewall.

At 902, an HTTP-based protocol request is sent to an application service provider (e.g., a web server at a data center). For example, an agent can send a GET or POST request by which certain parameters can be placed in the request. For instance, a node identifier can be passed to the server. The request can be periodically generated (e.g., according to 852 of FIG. 8). The frequency of the request can be controlled by an administrator via a configuration directive.

At 912, in response to the request, the server provides information for implementing a configuration directive. The information can include a command, a parameter, or software to be installed.

At 922, the node implements the configuration directive via the information. For example, the agent software can change the configuration of software being administered or acquire software to be installed.

Although administration can be accomplished via an application service provider scenario as illustrated, functionality of the software being administered need not be so provided. For example, a hybrid situation may exist where administration and distribution of the software is performed via an application service provider scenario, but components of the software being administered reside locally at the nodes.

EXAMPLE 6

Software Administration Over Many Enterprises

In some situations, it may be desirable for one vendor to host application services (e.g., software administration services) for more than one organization. For example, a vendor can host a plurality of customers to avoid having a data center for each customer, to avoid having to hire separate staff for each customer, or to otherwise reduce the cost of providing the services. The technologies described herein can be implemented in such a scenario.

Figure 10:
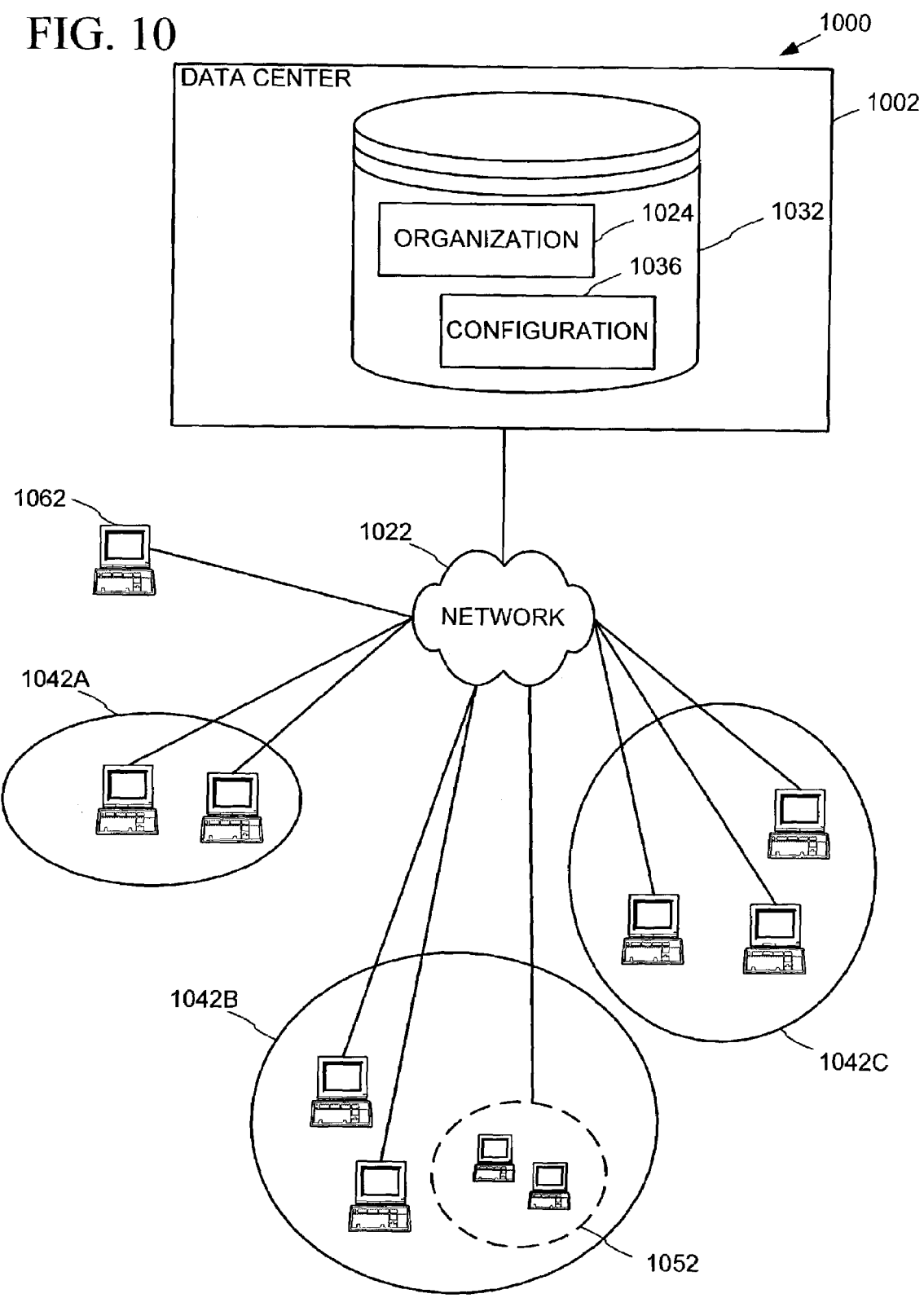
FIG. 10 depicts an exemplary scenario in which a vendor hosts application services for more than one organization.

FIG. 10 depicts an exemplary scenario 1000 in which a vendor hosts application services for more than one customer. The vendor can act as an application service provider or delegate the hosting responsibilities to another entity if desired. Also, it is possible for one application service provider to provide services for a plurality of vendors. It is also possible for the pictured scenario 1000 to be applied to a single organization (e.g., departments or geographical locations can be considered sub-organizations within such an organization).

In the example, a data center 1002 can include a variety of hardware and software (e.g., web servers) for processing requests from a variety of nodes via the network 1022. The network 1022 may be the Internet or some other network. In the case of the Internet, there may be one or more firewalls between the data center 1002 and the nodes administered. Such firewalls may block non-HTTP-based communications.

The data center 1002 can include a database 1032 that has an organization table 1034 and one or more configuration tables 1036. In this way, the database 1032 can track which nodes belong to which organization (e.g., via a nodes table) and the configuration directives appropriate for the nodes. Various other tables can also be included (e.g., a groups table). In some cases, an organization may be sensitive to having its information commingled with other organizations, so a separate table, a separate database, a separate server, or a separate data center 1002 can be maintained for such organizations, if desired.

As shown, three organizations 1042A, 1042B, and 1042C are availing themselves of the services provided by the application service provider via the data center 1002 over the network 1022. Within the organization, nodes can be associated into groups or subnets (e.g., the group 1052). Administration can be accomplished by an administrator accessing the data center 1002 (e.g., via an HTTP-based protocol) from within the respective organization, group, or subnet.

It is also possible that the organizations be administered by yet another entity via another computer 1062. For example, a consulting firm can perform software administration functions for the three organizations by accessing web pages over the Internet. The initial installation of agents to the nodes may be challenging in a situation where no administrator is behind the organization's firewall, but such installation can be accomplished by emailing an appropriate hyperlink to a user at the node. When activated, the hyperlink can install the appropriate agent software.

Software administration as described herein can be achieved via any of the illustrated scenarios. For example, an administrator inside or outside of an organization can access the data center 1002 to manipulate configuration settings designating nodes at which configuration directives are to be implemented. Security measures can be put into place to prevent unauthorized manipulation of configuration settings.

EXAMPLE 7

Groups

Various nodes can be placed into named groups to facilitate administration of a large number of nodes. For example, a set of nodes can be placed into a group named "lab" to designate that the nodes are machines in a lab where software functionality is tested. A group can have one or more nodes and be associated with a group name.

The named group can then be associated with various configuration directives, including association with software to be distributed to the nodes. In the example of the "lab" group, the nodes might be associated with an initial (e.g., beta) stage so that the computers in the lab are the first to receive a new version of software.

EXAMPLE 8

Policies

A set of configuration directives can be grouped into a named set called a policy. The policy can include any of the configuration directives described herein. The policy can be associated with nodes via the group mechanism described above. Examples of associating a configuration directive described herein can also be implemented by associating a policy comprising a set of one or more configuration directives.

In some cases, a policy is described as a set of rules. If a node is not in compliance with the rules in a policy, action is taken so that the node complies (e.g., software is provided, files are shared, or settings are altered).

EXAMPLE 9

Anti-Virus Software Administration

Figure 11:
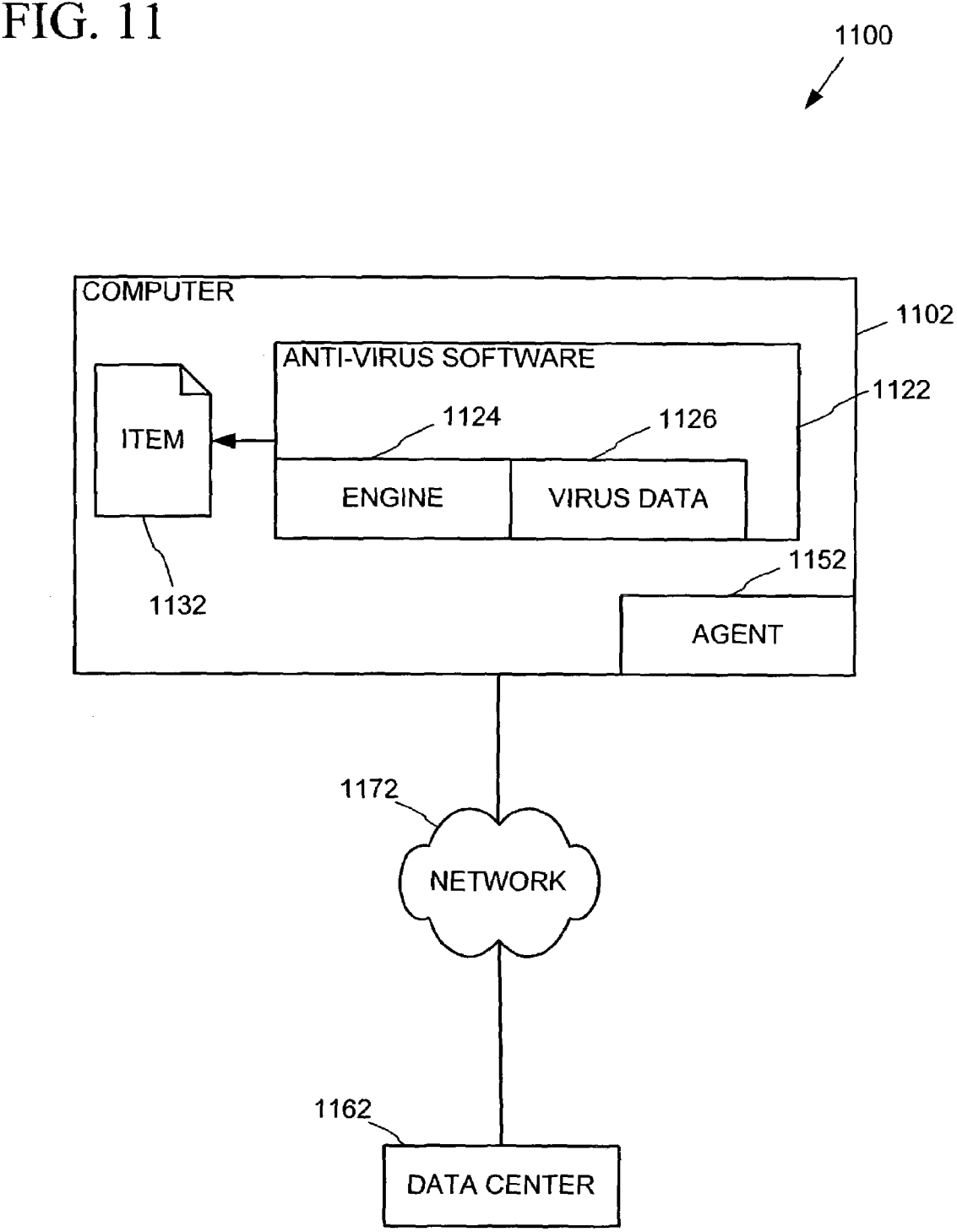
FIG. 11 is an exemplary arrangement involving anti-virus software.

In any of the examples described herein, the software being administered can be anti-virus software. An exemplary anti-virus software arrangement 1100 is shown in FIG. 11.

In the arrangement 1100, a computer 1102 (e.g., a node) is running the anti-virus software 1122. The anti-virus software 1122 may include a scanning engine 1124 and the virus data 1126. The scanning engine 1124 is operable to scan a variety of items (e.g., the item 1132) and makes use of the virus data 1126, which can contain virus signatures (e.g., data indicating a distinctive characteristic showing an item contains a virus). The virus data 1126 can be provided in the form of a file.

A variety of items can be checked for viruses (e.g., files on a file system, email attachments, files in web pages, scripts, etc.). Checking can be done upon access of an item or by periodic scans or on demand by a user or administrator (or both).

In the example, agent software 1152 communicates with a data center 1162 (e.g., operated by an application service provider) via a network 1172 (e.g., the Internet). Communication can be accomplished via an HTTP-based protocol. For example, the agent 1152 can send queries for updates to the virus data 1126 or other portions of the anti-virus software 1122 (e.g., the engine 1124).

Configuration directives appropriate for anti-virus software include modifying the interval between querying for updates to the virus data 1126 and whether a user interface for the anti-virus software is hidden from the user at the computer 1102 on which the virus software runs. Hiding the user interface may be desirable because a user might not be interested in configuring or otherwise interacting with the anti-virus software until an infection is detected.

EXAMPLE 10

Exemplary Implementation

FIGS. 12-16 are screen shots illustrating an exemplary implementation related to the above technologies. The screen shots show a user interface as presented by a web browser such as the Microsoft Internet Explorer software, which is marketed by Microsoft Corporation. Other software can be used, and either Internet (e.g., http://www.*sitename.com/xyz.asp*) or intranet (e.g., http://*subnet.companyname/xyz.asp*) references can be used to acquire the user interfaces. The illustrated user interface can be provided by any number of software packages, including a server-side scripting environment (e.g., Microsoft active server pages technology) associated with a web server.

To acquire access to the application services, an organization can enter into a contractual arrangement with an application service provider vendor (e.g., by subscribing to the services and agreeing to pay a monthly fee). The application service provider can provide an appropriate network link and a user name and password by which an administrator can log into the system and begin administering the software.

As described above, an administrator can acquire an installation utility and remotely deploy agent software to the nodes to be administered. The administrator can then go about the process of configuring how the nodes are to be administered.

During the process, it may be desirable to place one or more nodes into a group. FIG. 12 shows a screen shot 1200 depicting an exemplary user interface for manipulating groups. A database of configuration information can be adjusted according to the administrator's selections.

It may also be desirable to place one or more configuration directives into a named set (e.g., a policy). Such a named set can then be assigned to a group as shown in FIG. 13, which shows an exemplary user interface 1300 for manipulating policies. One directive of the policy (i.e., "Release State") relates to the stage of the software to be distributed for the group. The stage can be specified as "Beta," "Early," or "Live."

Figure 14:
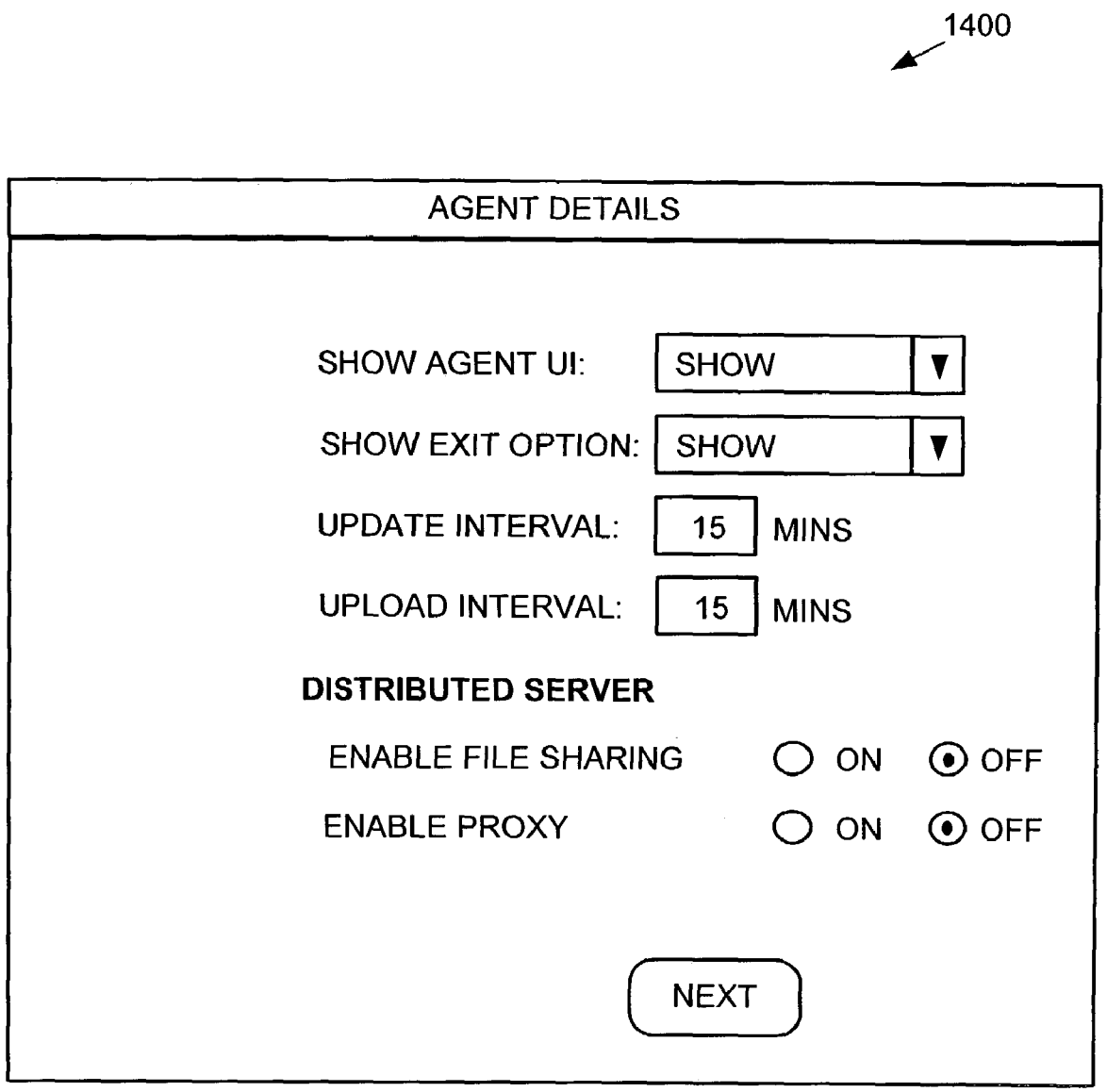
FIG. 14 is a screen shot showing an exemplary user interface for manipulating configuration directives related to an agent.

The configuration directives can take many forms. For example, FIG. 14 shows an exemplary user interface for manipulating configuration directives related to an agent. Changes by an administrator are stored in a configuration database, and agents assigned the related policy are updated accordingly (e.g., when they contact the application service provider data center). The user interface for the administered software can be hidden via the options (e.g., "Show Agent UI"). Also, as shown, an option "Show Exit option" can be used to control whether an icon appears in an icon menu by which a user can exit the software running at a node.

Figure 15:
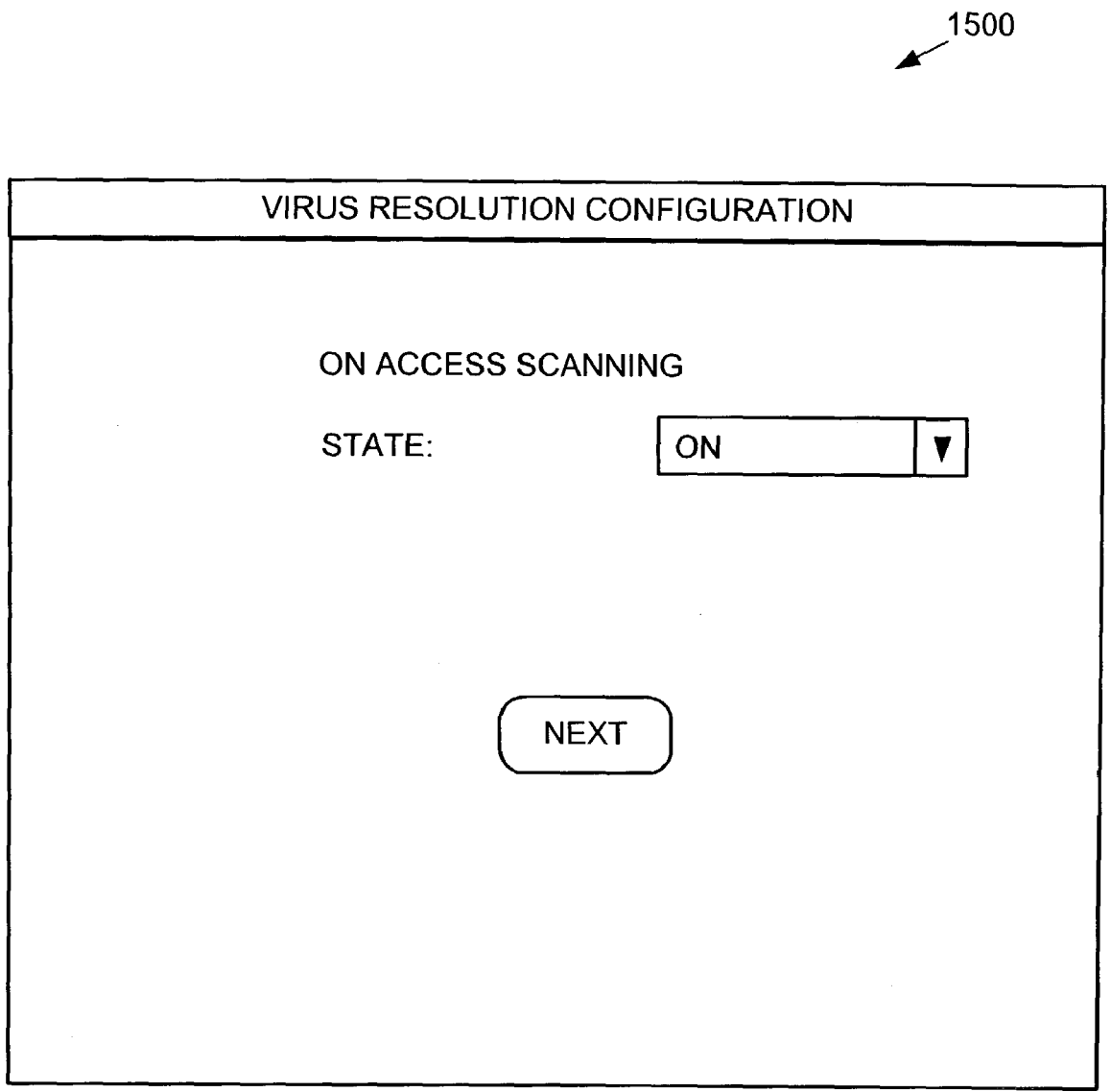
FIG. 15 is a screen shot showing an exemplary user interface for manipulating configuration directives related to virus infection resolution.

Other configuration directives are possible. FIG. 15 shows a configuration directive related to whether on-access scanning is enabled.

Figure 16:
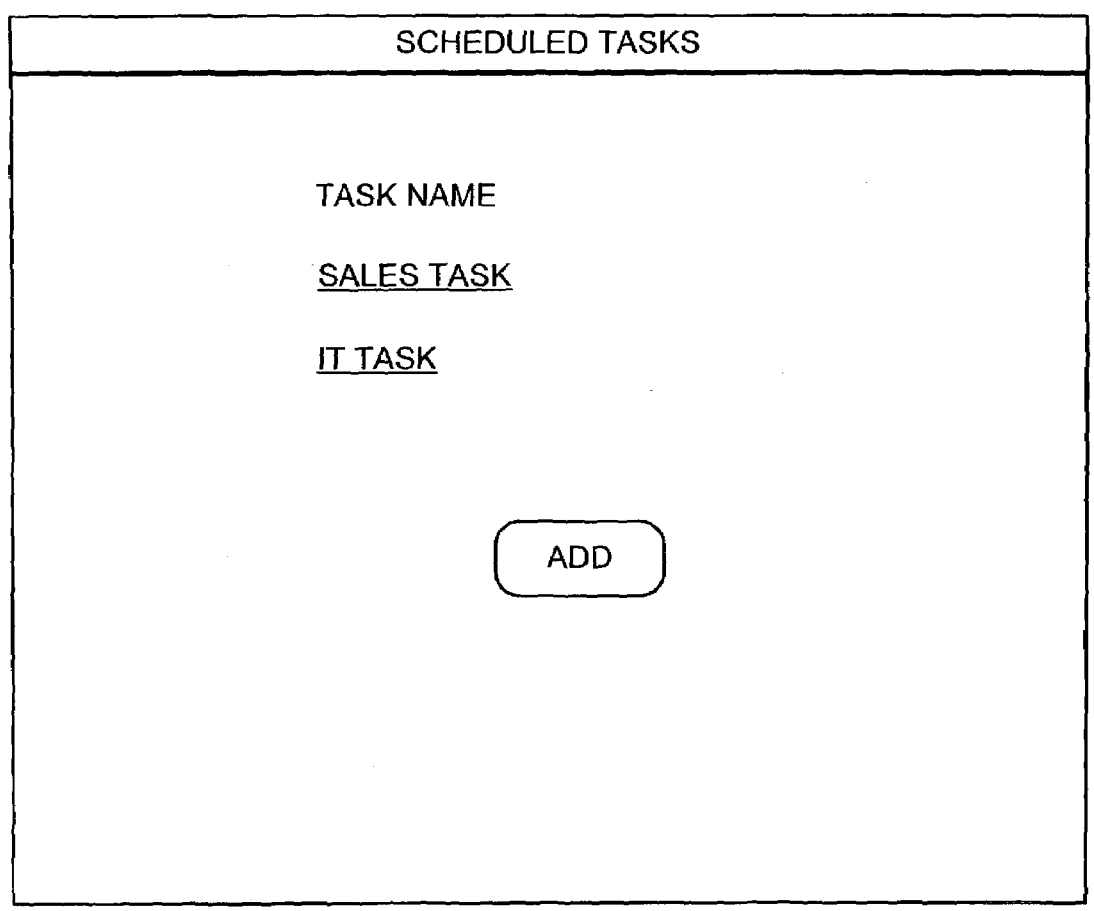
FIG. 16 is a screen shot showing an exemplary user interface for manipulating configuration directives related to scheduled tasks.
Figure 17C:
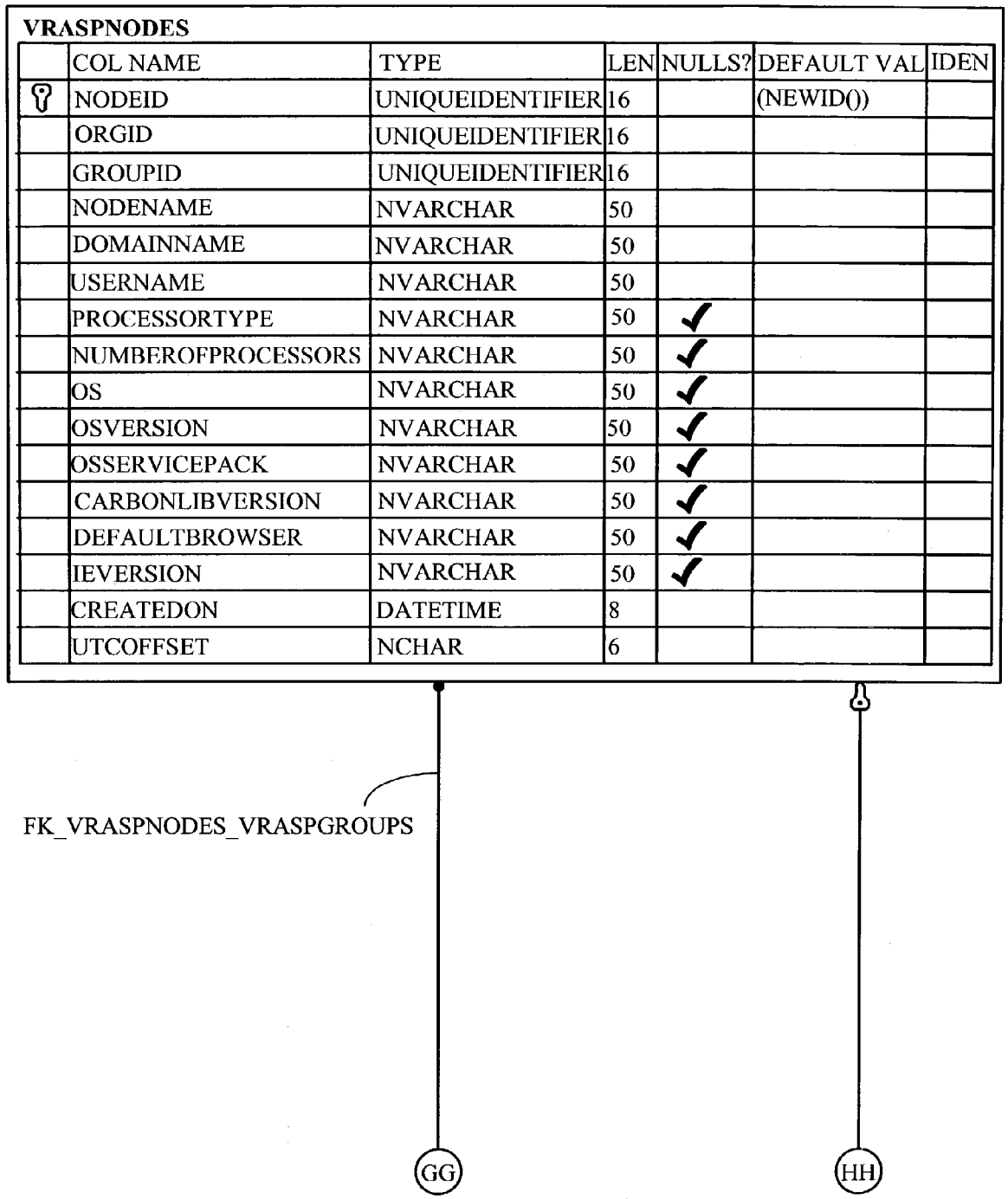
Figure 17E:
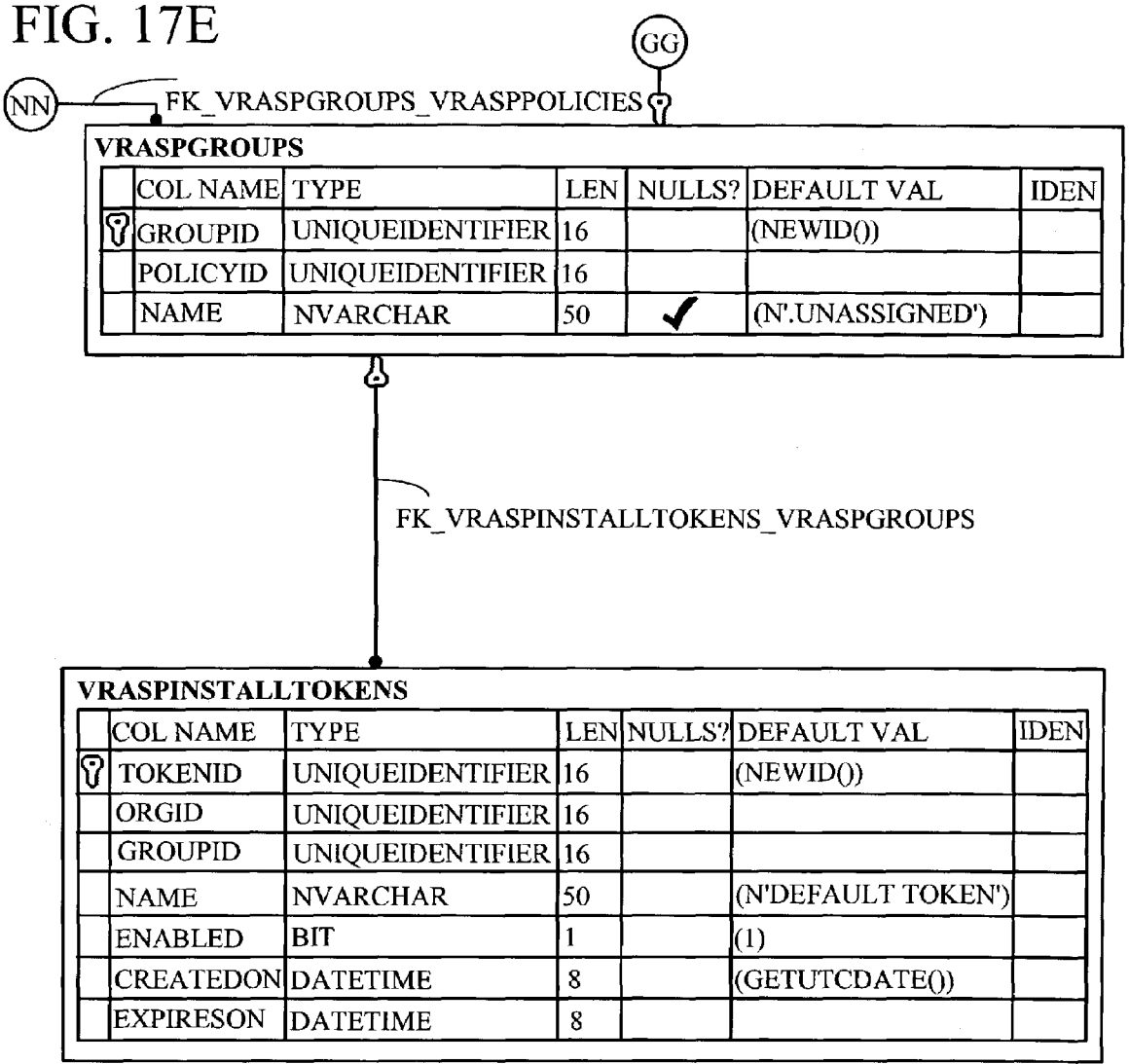
Figure 17F:
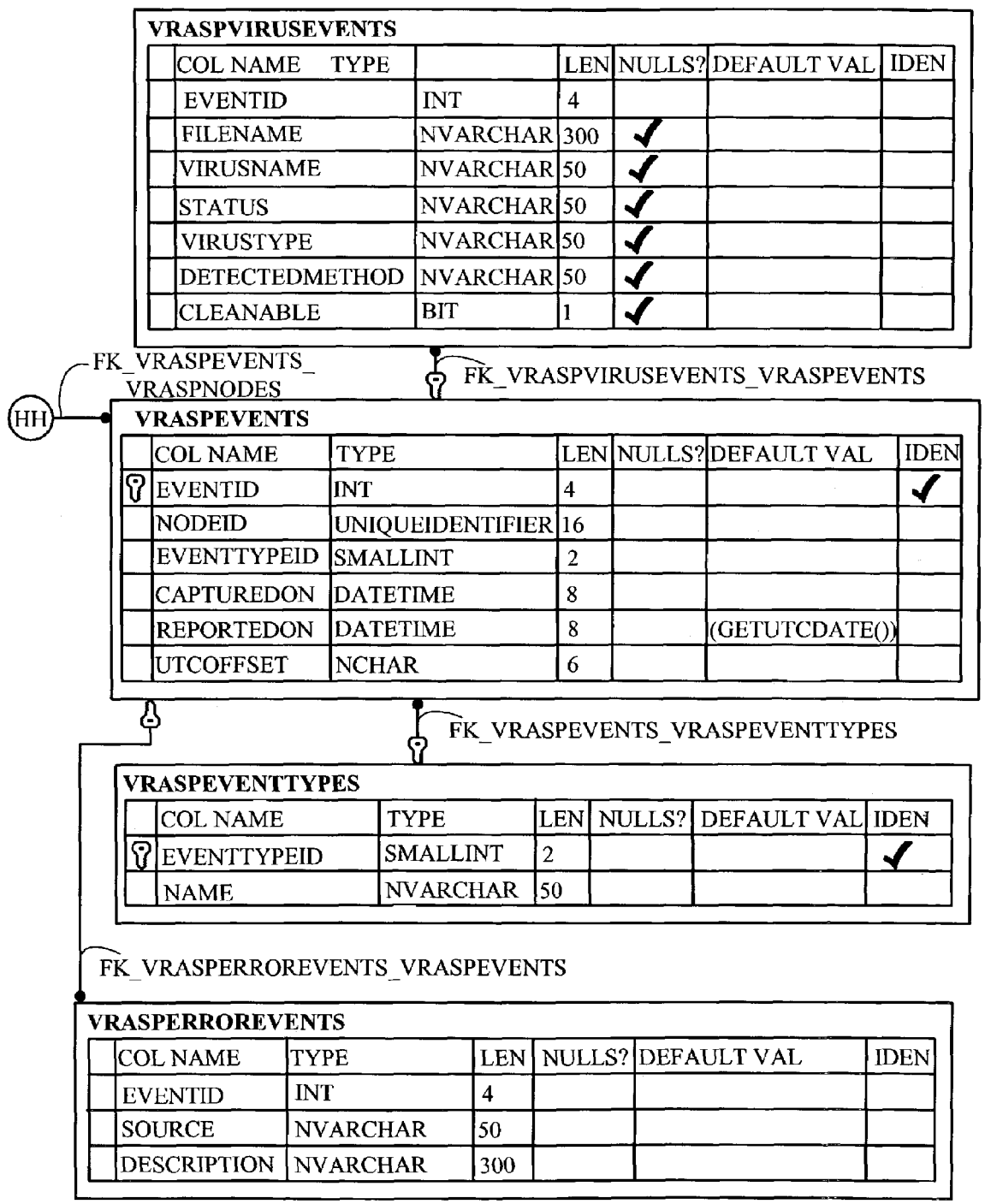
Figure 17G:
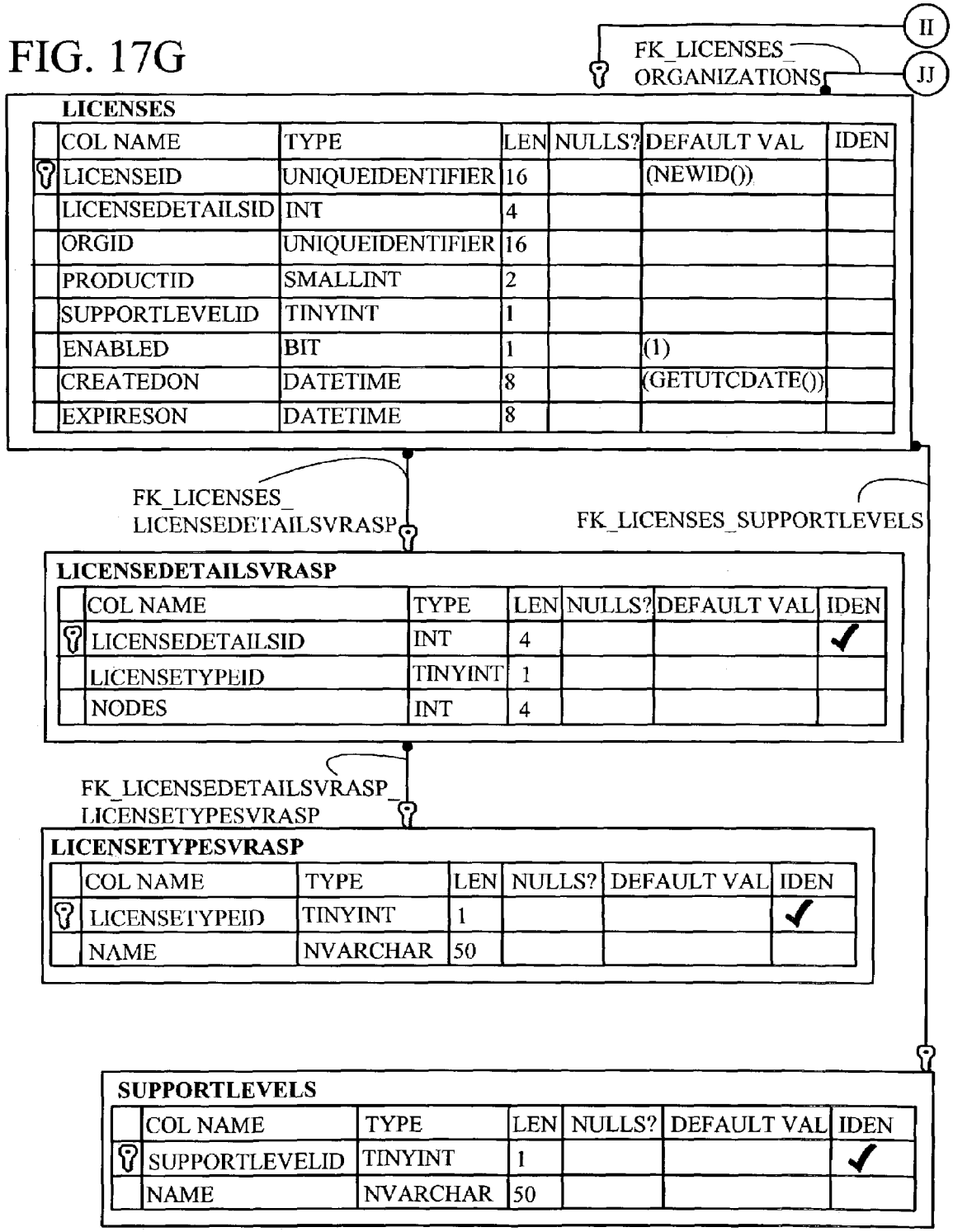
Figure 17H:
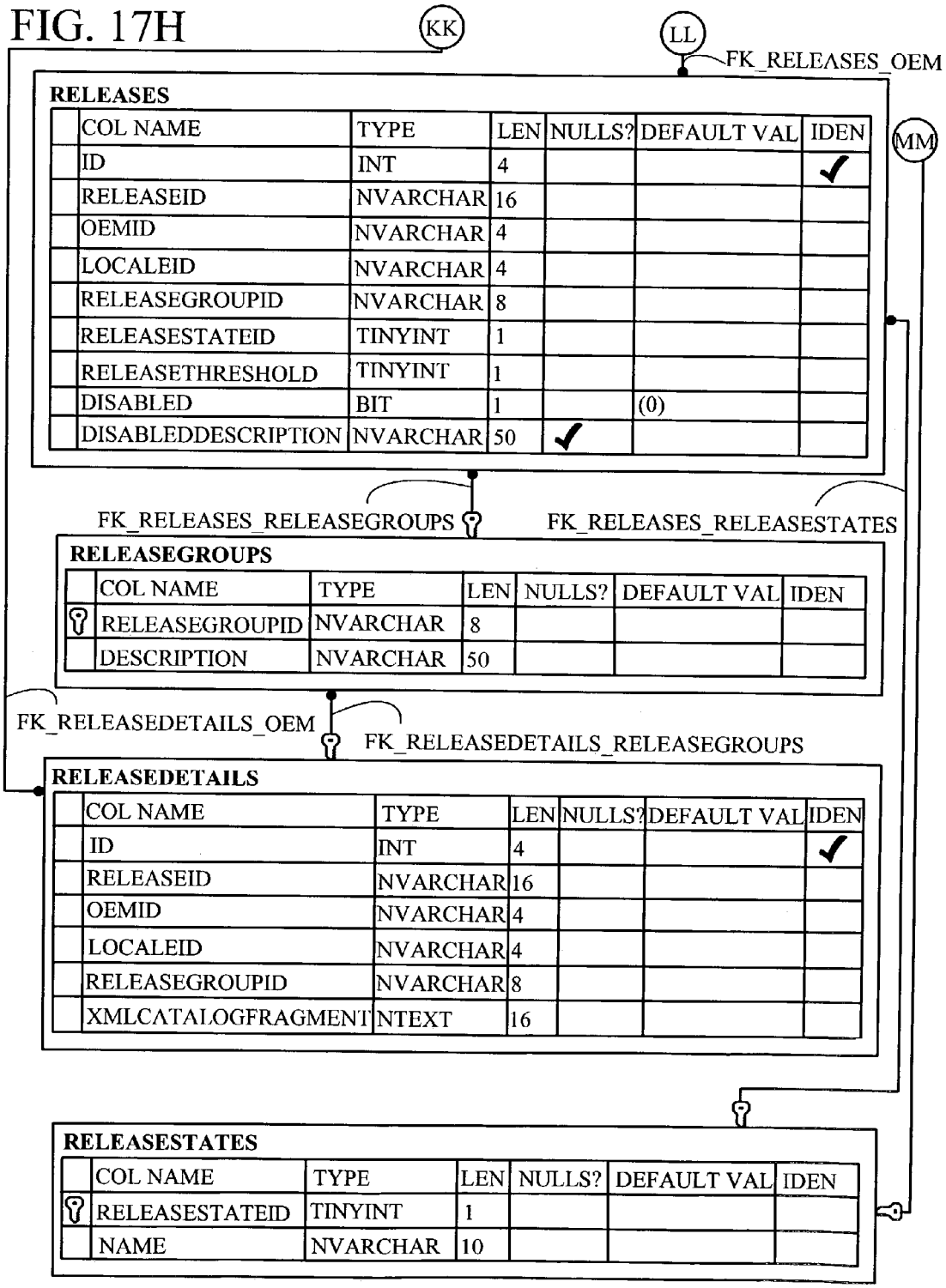
Figure 17I:
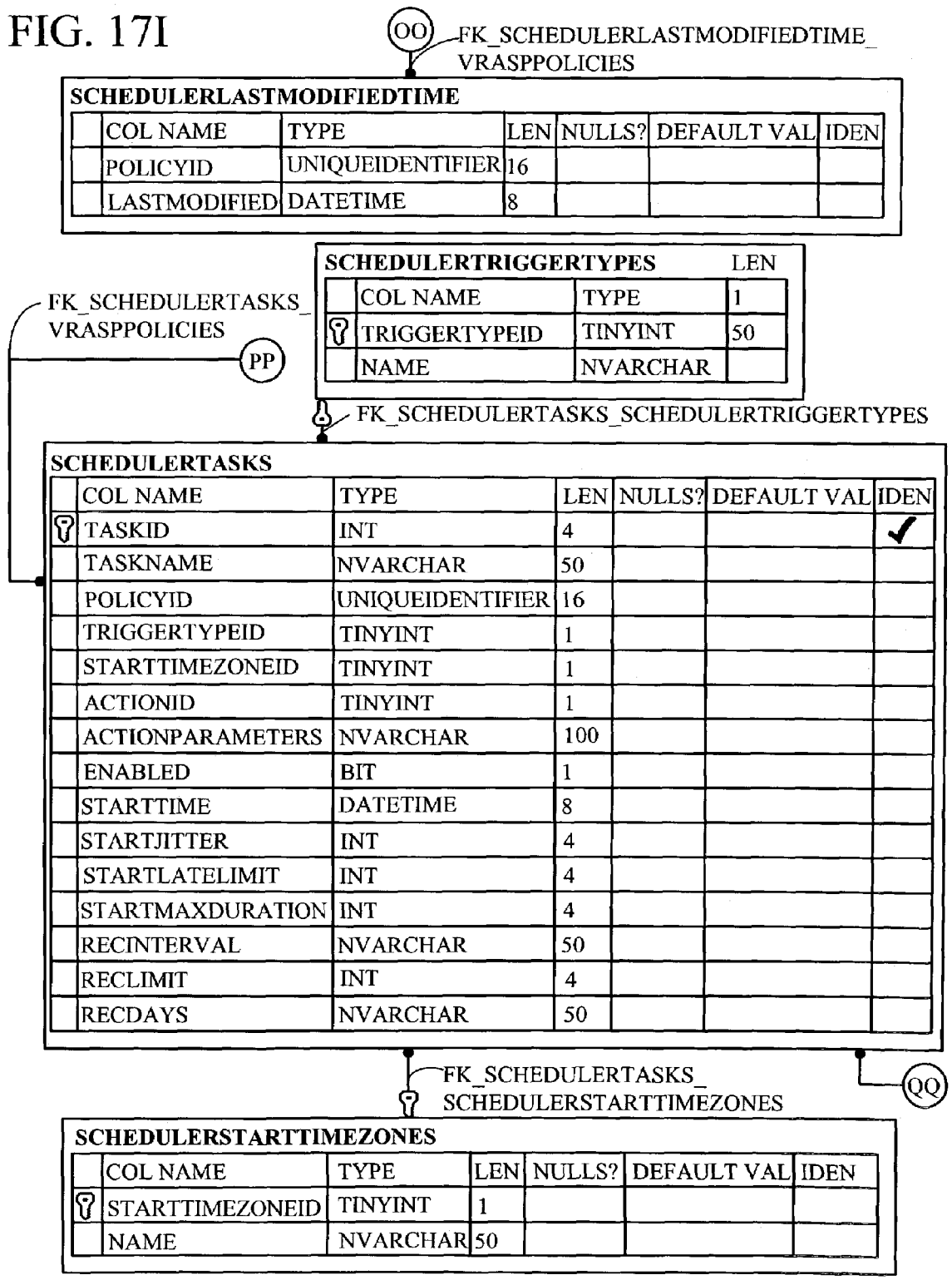

In addition, tasks can be scheduled for policies. For example, FIG. 16 is a screen shot showing an exemplary user interface 1600 by which an administrator can schedule tasks. Additional user interfaces can be presented by which tasks can be added and task recurrence can be specified. Additional recurrence parameters can be specified by another user interface (e.g., whether to occur every day or recur every n days, whether to recur indefinitely or n times, and whether to use default advanced settings, such as a jitter value, late limit, and maximum duration parameters). Alternatively, a task can be scheduled for a group.

Various other user interfaces can be presented. For example, a list of computers can be presented (e.g., indicating a computer name, domain, operating system, and group).

Software administration will proceed according to the configuration specified via the user interfaces. For example, if a group of computers has been assigned the "Beta" stage, upon availability of a software release associated with the "Beta" stage, queries from agents for appropriate software will be answered by providing a list including software of the "Beta" stage.

For example, agent software at a node can send an HTTP-based request to a data center, providing a node identifier unique to the node. In response, the data center can provide a list of software based on the configuration information specified by the administrator.

The agent software can then acquire the software it needs to conform with the configuration information specified by the administrator. In this way, automatic software distribution via configuration directives can be accomplished.

When a new release becomes available (e.g., a software development team releases software), it can be added to an appropriate database with a reference indicating a location from which the release can be obtained. Subsequent queries from agents receive replies taking the new release into account. The software will thus percolate down to the agents as they request it. If a node is off-line (e.g., a mobile user having a computer not connected to a network), there may be some lag time, but upon connecting to the network, the agent can query the data center and an appropriate software list can be provided.

In the example, the list of software can be a list of files conforming to the .CAB file specification of Microsoft Corporation. If software administered by the system is installed but not listed in the list, the software is uninstalled. The .CAB file may remain on the node so that another node can access it (e.g., in a peer-to-peer arrangement).

At some point, the software life cycle may begin again or move to an earlier stage in some other way. In such a case, beta versions of the software will be distributed to those nodes associated with a group that is associated with a policy specifying beta software.

In this way, software administration can be accomplished via an application service provider scenario. Although administration can include a wide variety of functions, the illustrated example enables monitoring (e.g., for producing reports of virus infection), configuration, and installation of software. In addition, the polled pull scenarios described can allow the system to operate even though there may be a firewall in place. Thus, application administration can be performed in such a way that software is automatically updated through a firewall. Such an arrangement can provide a valuable service in many situations, such as for a large enterprise's information technology department. Such an enterprise may have 10, 100, 1000, 10,000, 100,000, or more nodes.

Because more than one such enterprise can be served in an application service provider scenario, 10,000, 100,000, 1,000,000, 10,000,000, or more nodes can be administered by the described technologies.

EXAMPLE 11

Database Schema

FIGS. 17A-J show an exemplary database schema for implementing software administration via an application service provider scenario.

Figure 18A:
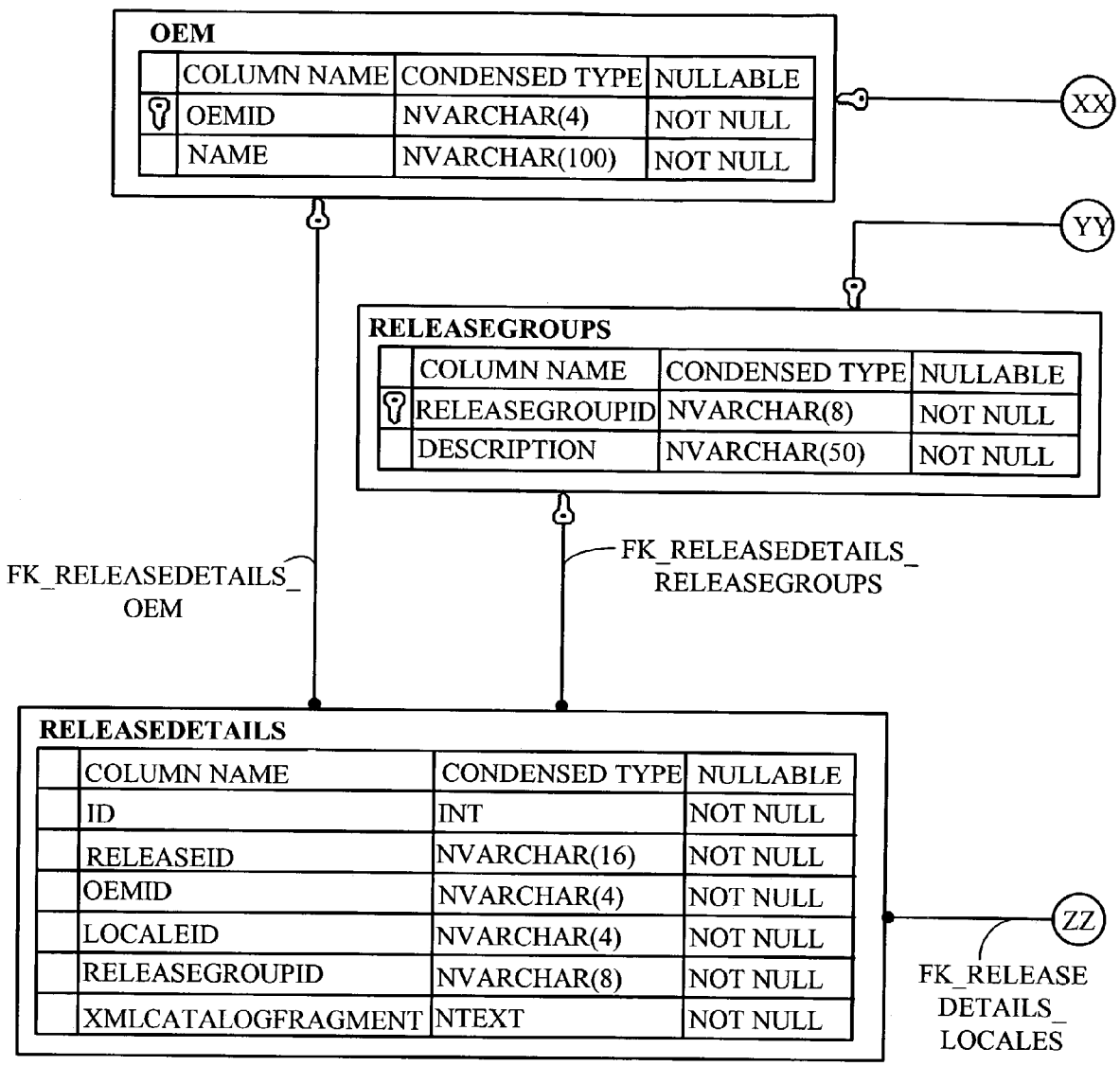
FIGS. 18A-18B show another exemplary database schema for use with an implementation.
Figure 18B:
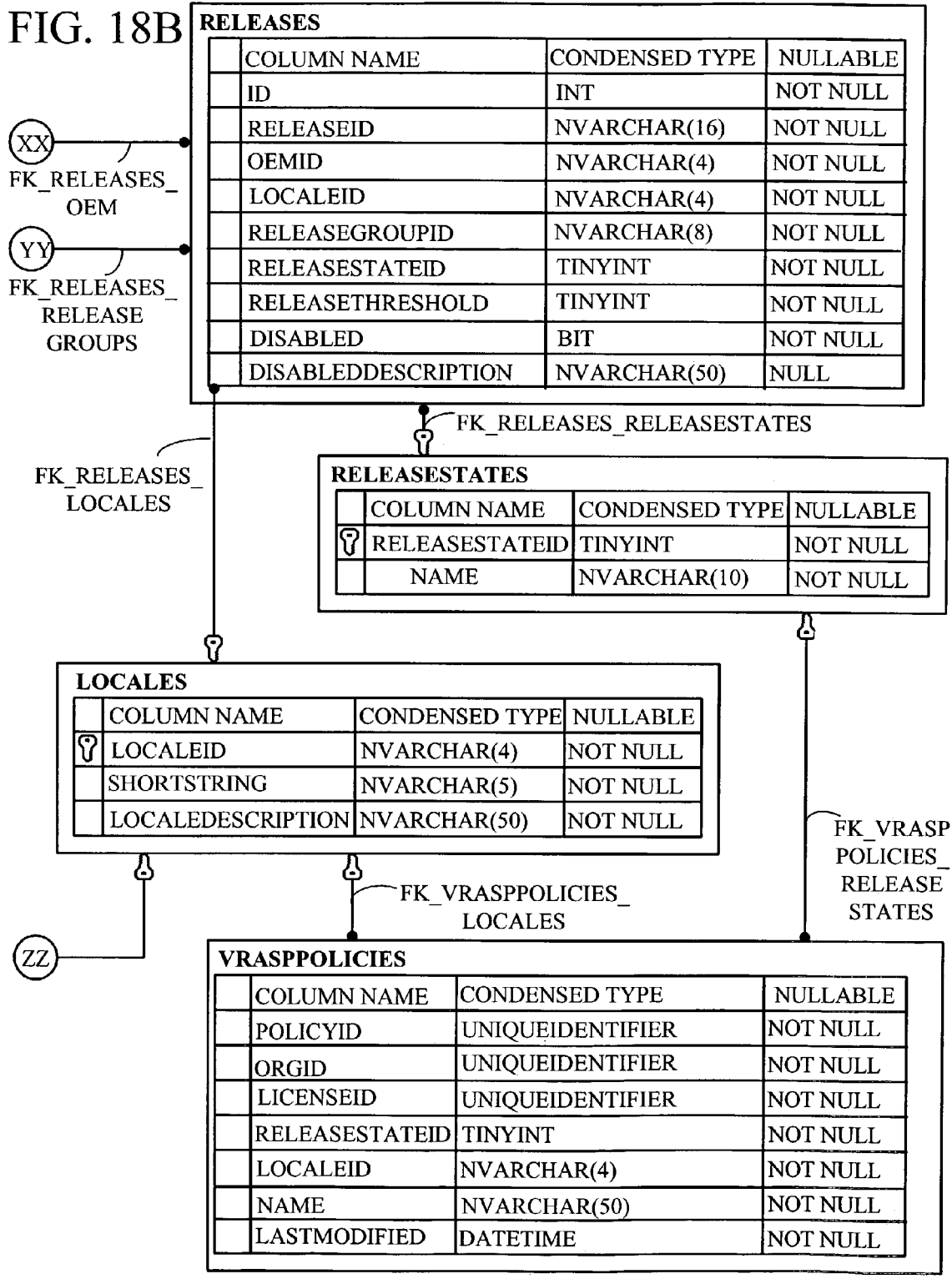

FIGS. 18A-B show another exemplary database schema for implementing software administration via an application service provider scenario.

The schema are examples only. A wide variety of other arrangements are possible, and another approach (e.g., XML) can be used.

Alternatives

Having described and illustrated the principles of our invention with reference to illustrated embodiments, it will be recognized that the illustrated embodiments can be modified in arrangement and detail without departing from such principles. It should be understood that the programs, processes, or methods described herein need not be related or limited to any particular type of computer apparatus. Various types of general purpose or specialized computer apparatus may be used with, or perform operations in accordance with, the teachings described herein. Elements of the illustrated embodiment shown in software may be implemented in hardware and vice versa.

Technologies from the preceding examples can be combined in various permutations as desired. Although some examples describe an application service provider scenario, the technologies can be directed to other arrangements. Similarly, although some examples describe anti-virus software, the technologies can be directed to other arrangements.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A computer-implemented method of providing software administration services for a set of nodes via an application service provider scenario, the method comprising:

collecting a set of one or more configuration directives for one or more nodes in the set of nodes via an application service provider scenario, wherein the one or more configuration directives are collected via a web protocol, the web protocol comprises an HTTP-based protocol, and the one or more configuration directives are received from activated user interface elements acquired via the application service provider scenario, whereby the application service provider scenario is configured to collect the one or more configuration directives through a firewall; and responsive to communications initiated by one or more nodes over a network, implementing the configuration directives at the nodes.

2. The method of claim 1 wherein at least two of the nodes are associated in a group, and at least one of the configuration directives is for the group.

3. The method of claim 1 wherein at least two of the configuration directives are associated into a named policy, and at least one node is associated with the policy.

4. The method of claim 1 wherein the configuration directives are received from a plurality of organizations.

5. The method of claim 1 wherein the configuration directives are received from a web browser.

6. The method of claim 1 wherein the configuration directives comprise directives for administering anti-virus software.

7. The method of claim 1 wherein the configuration directives comprise a directive indicating whether a user interface is to be displayed for administered software at an administered node.

8. The method of claim 1 wherein the configuration directives indicate whether a node is to share installable software files with other nodes.

9. The method of claim 1 wherein the configuration directives indicate software to be installed at the nodes.

10. The method of claim 1 wherein the configuration directives indicate a stage of software to be installed at the nodes.

11. The method of claim 1 wherein the software administration services are provided via software as a service.

12. A computer-readable storage medium comprising computer-executable instructions for performing the method of claim 1.

13. A computer-implemented method for achieving administration of anti-virus software at a plurality of computers within a plurality of organizations, the method comprising:
from a plurality of web browsers, receiving a plurality of configuration directives from activated user interface elements to be enforced at the nodes, wherein the configuration directives comprise an indication of configuration of anti-virus software at the nodes and are received in an application service provider scenario;
associating the configuration directives in a database with the nodes, wherein the database comprises an organizations database table; and
responsive to a request from agent software at a polling node, providing information to the agent software at the polling node by which anti-virus software at the polling node can be configured according to one of the configuration directives associated with the polling node;
wherein the receiving and the providing are accomplished via an HTTP-based protocol configured to provide the information to the polling node through a firewall.

14. A method of providing application services to a plurality of enterprises, the method comprising:
via an application service provider scenario configured to utilize an HTTP-based protocol, collecting indications through a firewall indicating configuration directives to be implemented at computers within the enterprises;
periodically receiving communications from agent software on the computers within the enterprises via an HTTP-based protocol; and
wherein the indications are received via activated user interface elements acquired via the application service provider scenario
responsive to the communications, implementing the configuration directives through a firewall at the computers within the enterprises.

15. The method of claim 14 further comprising:
grouping one or more of the configuration directives into a named set; and
associating the named set with one or more computers.

16. The method of claim 14 wherein the requests are received from an agent automatically without action by a user.

17. A computer-readable storage medium having computer-executable instructions for performing the method of claim 14.

18. A system for providing software administration services to a plurality of nodes via an application service provider scenario, the system comprising:
a data store operable to associate the nodes with configuration directives to be implemented thereat; and
a data center operable to receive indications of configuration directives to be associated with the nodes from activated user interface elements through a firewall via an HTTP-based protocol in an application service provider scenario and modify the data store responsive to the indications;
wherein the data center is further operable to receive communications from the nodes via an HTTP-based protocol whereby the configuration directives are implemented through a firewall according to configuration directive information in the data store.

19. The system of claim 18 wherein the data center is operable to receive indications of one or more groups into which the nodes are placed; and at least one configuration directive is associated with the groups.

20. A system for administering software via a network, the system comprising:
means for receiving information associating nodes with configuration directives via activated user interface elements in an application service provider scenario; and
means for replying to communications from the nodes to implement the configuration directives at the nodes associated thereto;
wherein the means for receiving information is configured to receive the information through a firewall via an HTTP-based protocol; and
wherein the means for replying to communications is configured to reply to the communications through a firewall via an HTTP-based protocol.

21. The system of claim 20 wherein the system administers software at 1,000,000 or more nodes.

22. The system of claim 20 wherein the system administers software at 10,000,000 or more nodes.

23. A computer user interface for achieving software administration at a plurality of computers, the computer user interface comprising:
a user interface element for specifying that a named set of one or more configuration directives are to be applied to a named group of one or more computers;
wherein the user interface element is delivered by a data center via an HTTP-based protocol through a firewall, and responsive to activation of the user interface element, the data center responds to HTTP-based polls by polling computers out of the one or more computers of the named group with information indicating that the configuration directives are to be implemented at the polling computers; and
wherein the computer user interface element is presented via an application service provider scenario.

24. A computer user interface for achieving software administration at a plurality of computers, the computer user interface comprising:

a user interface element for specifying that a named set of one or more configuration directives are to be applied to a named group of one or more computers;

wherein the user interface element is delivered by a data center via an application service provider scenario utilizing an HTTP-based protocol, and responsive to activation of the user interface element, the data center responds to polls by polling computers out of the one or more computers of the named group with information indicating that the configuration directives are to be implemented at the polling computers;

wherein the polls are handled according to an application service provider scenario; and wherein the application service provider scenario is configured to deliver the user interface element and handle the polls through a firewall.

* * * * *

UNITED STATES PATENT AND TRADEMARK OFFICE
CERTIFICATE OF CORRECTION

| | | |
|---|---|---|
| PATENT NO. | : 7,401,133 B2 | |
| APPLICATION NO. | : 10/421669 | |
| DATED | : July 15, 2008 | |
| INVENTOR(S) | : Huang et al. | |

It is certified that error appears in the above-identified patent and that said Letters Patent is hereby corrected as shown below:

On the Title Page:
In Foreign Patent Documents, the following should be added: --EP 0811 942 A3 2/1999--.

In Other Publications, col. 1 page 1, line 23, "verison" should read --version--.
In Other Publications, col. 1 page 2, line 17, "briefs.virii" should read --briefs/virii--.
In Other Publications, col. 1 page 2, line 20, "Question" should read --Questions--.
In Other Publications, col. 1 page 2, line 39, "foldoc/cgi?" should read --foldoc/foldoc.cgi?--.
In Other Publications, col. 1 page 2, line 52, "webquest" should read --webguest--.
In Other Publications, col. 1 page 3, line 50, "Web-based Managed" should read --Web-based, Managed--.
In Other Publications, col. 1 page 3, line 54, "Environement," should read --Environment--.
In Other Publications, col. 2 page 3, line 12, "ww." should read --www.--.
In Other Publications, col. 2 page 3, line 45, "Virex" should read --VIREX--.

In the Specification:
Column 7, line 44, "CAB" should read --.CAB--.

In the Claims:
Column 15, lines 53-67,
"A method of providing application services to a plurality of
enterprises, the method comprising:
via an application service provider scenario configured to
  utilize an HTTP-based protocol, collecting indications
  through a firewall indicating configuration directives to
  be implemented at computers within the enterprises;
periodically receiving communications from agent software
  on the computers within the enterprises via an HTTP-based protocol; and Signed and Sealed this
Thirtieth Day of August, 2011

David J. Kappos
*Director of the United States Patent and Trademark Office*

CERTIFICATE OF CORRECTION (continued)
U.S. Pat. No. 7,401,133 B2 wherein the indications are received via activated user interface elements acquired via the application service provider scenario responsive to the communications, implementing the configuration directives through a firewall at the computers within the enterprises." should read --A method of providing application services to a plurality of enterprises, the method comprising:

via an application service provider scenario configured to utilize an HTTP-based protocol, collecting indications through a firewall indicating configuration directives to be implemented at computers within the enterprises, wherein the indications are received via activated user interface elements acquired via the application service provider scenario;

periodically receiving communications from agent software on the computers within the enterprises via an HTTP-based protocol; and responsive to the communications, implementing the configuration directives through a firewall at the computers within the enterprises.--.